US012652098B2

(12) United States Patent
Bendlin et al.

(10) Patent No.: US 12,652,098 B2
(45) Date of Patent: Jun. 9, 2026

(54) TUNABLE CELL FOR HIGH-SPEED SURFACE MODULATION

(71) Applicants: AT&T Intellectual Property I, L.P., Atlanta, GA (US); University of Notre Dame du Lac, South Bend, IN (US)

(72) Inventors: Ralf Bendlin, Cedar Park, TX (US); Bertrand Martyn Hochwald, South Bend, IN (US); Jonathan David Chisum, South Bend, IN (US); Himanshu Sharma, South Bend, IN (US)

(73) Assignees: AT&T Intellectual Property I, L.P., Atlanta, GA (US); University of Notre Dame du Lac, South Bend, IN (US)

( * ) Notice: Subject to any disclaimer, the term of this patent is extended or adjusted under 35 U.S.C. 154(b) by 0 days.

(21) Appl. No.: 18/665,636

(22) Filed: May 16, 2024

(65) Prior Publication Data

US 2025/0357994 A1     Nov. 20, 2025

(51) Int. Cl.
H04B 7/17 (2006.01)
H01Q 15/00 (2006.01)
H04L 27/36 (2006.01)

(52) U.S. Cl.
CPC ........... H04B 7/17 (2013.01); H01Q 15/0086 (2013.01)

(58) Field of Classification Search
CPC ....... H04B 7/17; H01Q 15/0086; H04L 27/36
USPC ................ 375/260, 261, 279, 280, 281, 308
See application file for complete search history.

(56) References Cited

U.S. PATENT DOCUMENTS

| | | | |
|---|---|---|---|
| 5,986,500 A | 11/1999 | Park et al. | |
| 8,767,657 B1 | 7/2014 | Dehghan et al. | |
| 10,194,327 B1 | 1/2019 | Khan | |
| 10,333,604 B2 | 6/2019 | Forenza et al. | |
| 11,121,896 B1 | 9/2021 | Bendlin et al. | |
| 11,239,877 B1 | 2/2022 | Chopra et al. | |
| 11,303,347 B1 | 4/2022 | Bendlin et al. | |
| 2007/0115160 A1 | 5/2007 | Kleveland et al. | |
| 2008/0001750 A1 | 1/2008 | Kurup | |

(Continued)

OTHER PUBLICATIONS

Massive MIMO Systems for 5G and beyond Networks-Overview, Recent Trends, Challenges, and Future Research Direction; Sensors 2020, 20, 2753; doi:10.3390/s20102753; pp. 1-35.

(Continued)

*Primary Examiner* — Phuong Phu
(74) *Attorney, Agent, or Firm* — Guntin & Gust, PLC; Kenneth S. Kwan

(57) ABSTRACT

Aspects of the subject disclosure may include, for example, a group of controllable surface cells of an intelligent controllable surface, wherein the surface cells include input surfaces in communication with a waveguide and configured to receive an RF carrier signal via the waveguide. The controllable surface also includes a group of output surfaces and a group of control terminals in communication with the controllable surface cells and configured to receive an information signal. The intelligent controllable surface includes a group of controllable devices in communication with the control terminals, wherein the controllable devices are configured to control scattering parameters of the controllable surface cells responsive to the information signal to impress a direct modulation upon the RF carrier signal. Other embodiments are disclosed.

20 Claims, 20 Drawing Sheets

(56) References Cited

U.S. PATENT DOCUMENTS

| | | | |
|---|---|---|---|
| 2010/0178057 A1 | 7/2010 | Shieh | |
| 2010/0239258 A1 | 9/2010 | Calabretta et al. | |
| 2011/0011938 A1 | 1/2011 | Kurup | |
| 2014/0085008 A1 | 3/2014 | Cohen et al. | |
| 2014/0087673 A1 | 3/2014 | Mostov et al. | |
| 2015/0030102 A1 | 1/2015 | Hormis et al. | |
| 2015/0263780 A1 | 9/2015 | Mehlman et al. | |
| 2016/0056846 A1 | 2/2016 | Moher et al. | |
| 2016/0103199 A1 | 4/2016 | Rappaport | |
| 2017/0070194 A1 | 3/2017 | Briffa et al. | |
| 2017/0077877 A1 | 3/2017 | Anderson | |
| 2017/0085398 A1 | 3/2017 | Liu | |
| 2020/0204120 A1 | 6/2020 | Zhang | |
| 2021/0083716 A1 | 3/2021 | Posselt et al. | |
| 2021/0359409 A1 | 11/2021 | Gómez-Diaz et al. | |
| 2022/0045705 A1 | 2/2022 | Bendlin et al. | |
| 2022/0059943 A1 | 2/2022 | Saab et al. | |
| 2022/0102863 A1 | 3/2022 | Shekhar et al. | |
| 2023/0421207 A1 | 12/2023 | Ellenbeck et al. | |
| 2024/0039592 A1 | 2/2024 | Dai et al. | |
| 2024/0088957 A1 | 3/2024 | Wang et al. | |
| 2024/0097744 A1 | 3/2024 | Bhamri et al. | |
| 2024/0097745 A1 | 3/2024 | Meyer et al. | |
| 2024/0098516 A1 | 3/2024 | Yildiz et al. | |
| 2024/0171447 A1 * | 5/2024 | Hemadeh | H04L 27/36 |
| 2025/0294602 A1 | 9/2025 | Bendlin et al. | |

OTHER PUBLICATIONS

"Applications of Low-Voltage Differential Signaling (LVDS) in LED Walls", Texas Instruments, Nov. 2020, 9 Pages.

"Evolved Universal Terrestrial Radio Access (E-UTRA); User Equipment (UE) radio transmission and reception (3GPP TS 36.101 version 8.2.0 Release 8)", ETSI TS 136 101 V8.2.0, Nov. 2008, 70 pages.

Abeywickram, Samith , et al., "Intelligent Reflecting Surface: Practical Phase Shift Model and Beamforming Optimization", arXiv:1907.06002v4 [eess.SP], Feb. 25, 2020, 7 Pages.

Abeywickrama, Samith , et al., "Intelligent Reflecting Surface: Practical Phase Shift Model and Beamforming Optimization", arXiv:2002.10112v1 [cs.IT], Feb. 24, 2020, 30 Pages.

Adán, Darian Pérez, et al., "Intelligent Reflective Surfaces for Wireless Networks: An Overview of Applications, Approached Issues, and Open Problems", https://www.researchgate.net/publication/354862164, Sep. 2021, 28 Pages.

Bazrafkan , et al., On the Capacity of Massive MIMO With 1-Bit ADCs and DACs at the Receiver and at the Transmitter, arXiv:1911.04694v1 [cs.IT] Nov. 12, 2019, pp. 1-25.

Bioglio, Valerio , et al., "Design of Polar Codes in 5G New Radio", IEEE, Jan. 6, 2020, 12 pages.

Cao, Chen , "Low-resolution ADC receiver design, MIMO interference cancellation prototyping, and PHY secrecy analysis." (2017). Electronic Theses and Dissertations. Paper 2697, pp. 1-122.

Eisenhart, Robert L., "Section 4 Waveguide & Circuits", A Collection of Thoughts, Tips and Techniques for Microwave Circuit Design, Nov. 2020, 45 Pages.

Gao, Kang , et al., Beamforming with Multiple One-Bit Wireless Transceivers, arXiv:1802.04923v1 [cs.IT] Feb. 14, 2018; pp. 1-7.

Gao, Kang, et al., Power-Performance Analysis of a Simple One-Bit Transceiver, Undated, pp. 1-10.

Gao, Jianbang , et al., "Spatial Modulation and MP-WFRFT-Aided Multi-Beam Wireless Communication Scheme Based On Random Frequency Diverse Array", www.mdpi.com/journal/sensors, Sep. 16, 2020, 17 Pages.

Granja, Angel , et al., Ultra-Broadband W-Band Balanced Schottky Diode Envelope Detector for High-Data Rate Communication Systems; IEEE DOI: 10.1109/IRMMW-THz.2018.8510047; 2018; pp. 1-2.

Jorgesen, Doug , "What happens when you underdrive a mixer?", https://www.markimicrowave.com/blog/what-happens-when-you-underdrive-a-mixer/, Apr. 30, 2015, 5pgs.

Larsson, Erik G., Massive MIMO for Next Generation Wireless Systems; arXiv:1304.6690v3; Jan. 21, 2014, pp. 1-20.

Lau, Jonathan Yun, "Reconfigurable Transmitarray Antennas", 2012, 286 Pages.

Li, Yongzhi , et al., Channel Estimation and Performance Analysis of One-Bit Massive MIMO Systems; IEEE Transactions on Signal Processing, vol. 65, No. 15, Aug. 1, 2017; pp. 1-15.

Long, S. , "ECE145B/ECE218B Mixer Lectures", https://www.coursehero.com/file/37659401/Mixer1pdf/, Apr. 9, 2009, 65pgs.

Marki, Christopher , "The Mixer 10 Commandments—Marki Microwave RF & Microwave", https://www.markimicrowave.com/blog/the-mixer-10-commandments/, Apr. 29, 2010, 2 pgs.

Molev-Shteiman, Arkady , et al., "Low Resolution Digital-to-Analog Converter with Digital Dithering for MIMO Transmitter", Accessed Mar. 14, 2024, 5 pages.

Okogbaa, Fred Chimzi, et al., "Design and Application of Intelligent Reflecting Surface (IRS) for Beyond 5G Wireless Networks: A Review", https://www.mdpi.com/journal/sensors, Mar. 22, 2022, 24 Pages.

Perez-Adan, Darian , "Intelligent Reflective Surfaces for Wireless Networks: An Overview of Applications, Approached Issues, and Open Problems", https://www.mdpi.com/journal/electronics, Sep. 25, 2021, 27 Pages.

Raleigh, Gregory G., et al., Spatio-Temporal Coding for Wireless Communication; IEEE Transactions on Communications, vol. 46, No. 3, Mar. 1998; pp. 1-10.

Sarajlic, Muris , et al., When Are Low Resolution ADCs Energy Efficient in Massive MIMO?; Digital Object Identifier 10.1109/ACCESS.2017.2731420; Jul. 24, 2017; pp. 1-17.

Sharma, Ashish , et al., "Intelligent Re ective Surfaces and its Application Across Various Communication Techniques: A Review", https://doi.org/10.36227/techrxiv.23677509.v1, Oct. 31, 2023, 29 Pages.

Stiles, Jim , "Mixer Conversion Loss", https://wenku.baidu.com/view/c733d9150b4e767f5acfce87.html, Mar. 7, 2005, 6 pgs.

Tan, Xin , et al., "Enabling Indoor Mobile Millimeter-wave Networks Based on Smart Reflect-arrays", IEEE Infocom 2018—IEEE Conference on Computer Communications, 2018, 9 Pages.

Tapio, Visa , et al., "Survey on reconfigurable intelligent surfaces below 10 GHZ", Tapio et al. J Wireless Com Network (2021) 2021:175, 2021, 18 Pages.

Uzunkol, Mehmet , Low noise Millimeter-wave and THz Receivers, Imaging Arrays, Switches in Advanced CMOS and SiGe Processes; 2013; pp. 1-138.

Vandana, CH. , et al., Spatial Multiplexing in Massive MIMO with QPSK; International Journal of Engineering and Advanced Technology (IJEAT); ISSN: 2249-8958, vol. 8 Issue-4, Apr. 2019; pp. 1-3.

Xu, Ling , et al., "Secure Hybrid Digital and Analog Precoder for mmWave Systems with low-resolution DACs and finite-quantized phase shifters", IEEE, May 13, 2019, 11 pages.

Zaki, Amira I., et al., "A Generalized Spatial Modulation System Using Massive MIMO Space Time Coding Antenna Grouping", www.mdpi.com/journal/entropy, Nov. 30, 2020, 10 Pages.

* cited by examiner

220

250

MTS: 1 Gbps

LO: 39 GHz

260

280

(REAR VIEW)

(SECTION B-B')

BB (Gbps GPIO)

RF

280'

270

(TOP VIEW)

(SECTION A-A')

BB (Gbps GPIO)

RF

LO (39 GHz)

270'

290

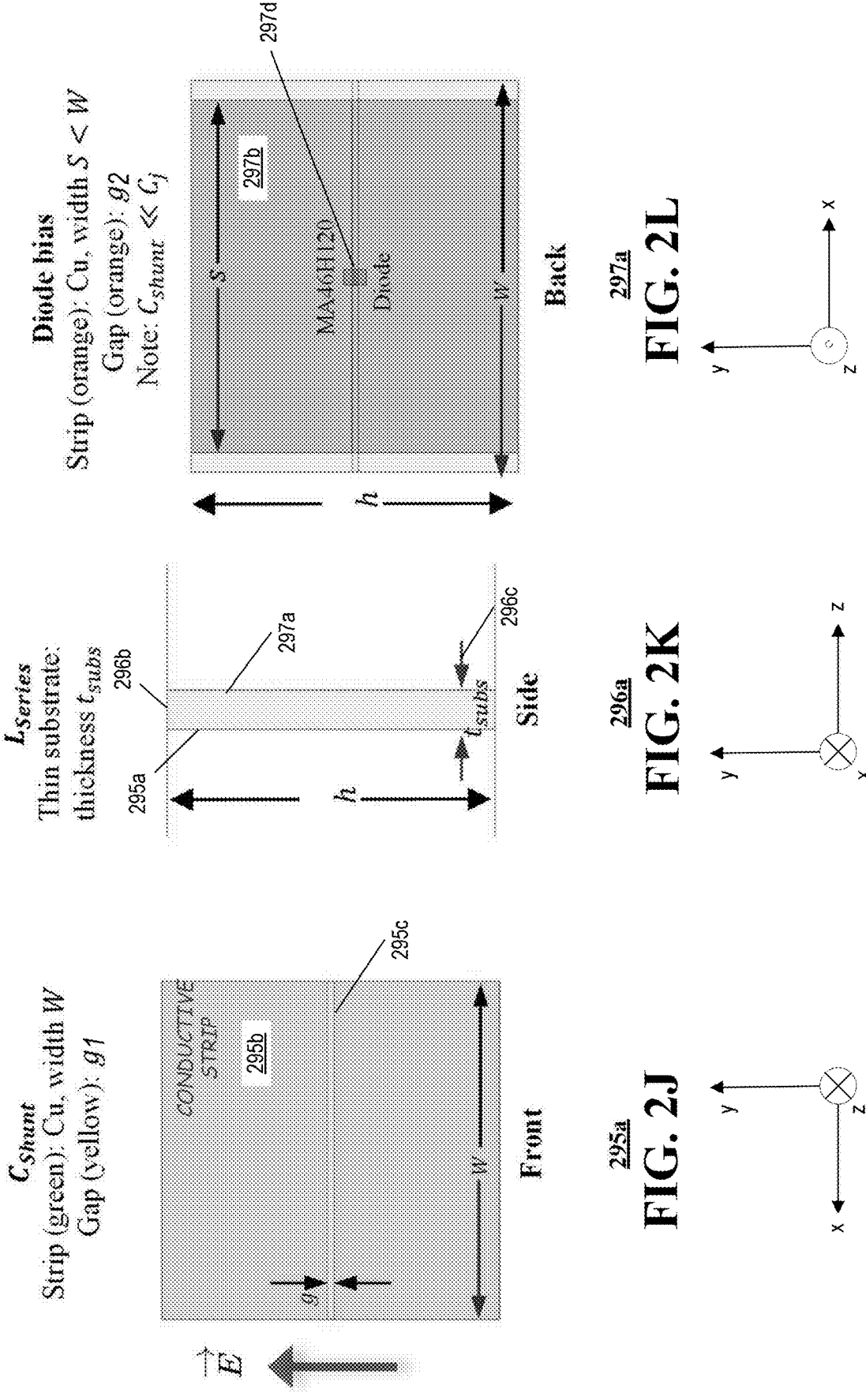

Equivalent Circuit Model

<u>300a</u>

<u>301</u>

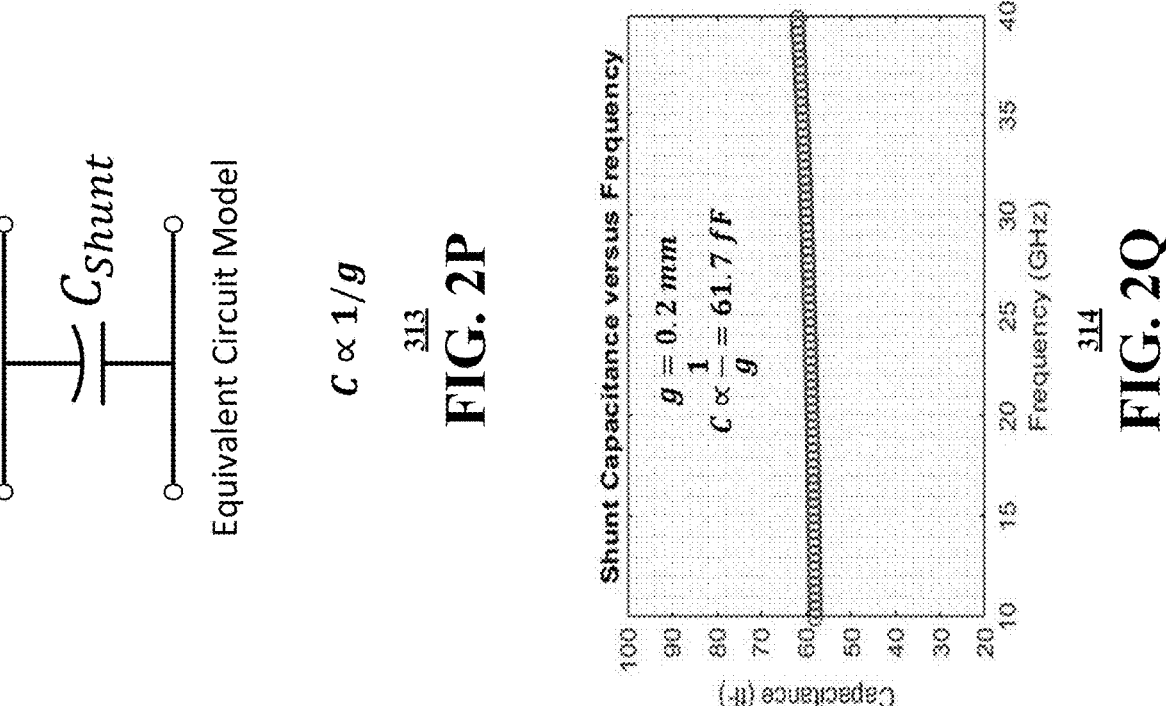
$$C_{Shunt}$$
Equivalent Circuit Model
$$C \propto 1/g$$
<u>313</u>
FIG. 2P
Shunt Capacitance versus Frequency
$g = 0.2 \, mm$
$C \propto \dfrac{1}{g} = 61.7 \, fF$
Frequency (GHz)
Capacitance (fF)
<u>314</u>
FIG. 2Q
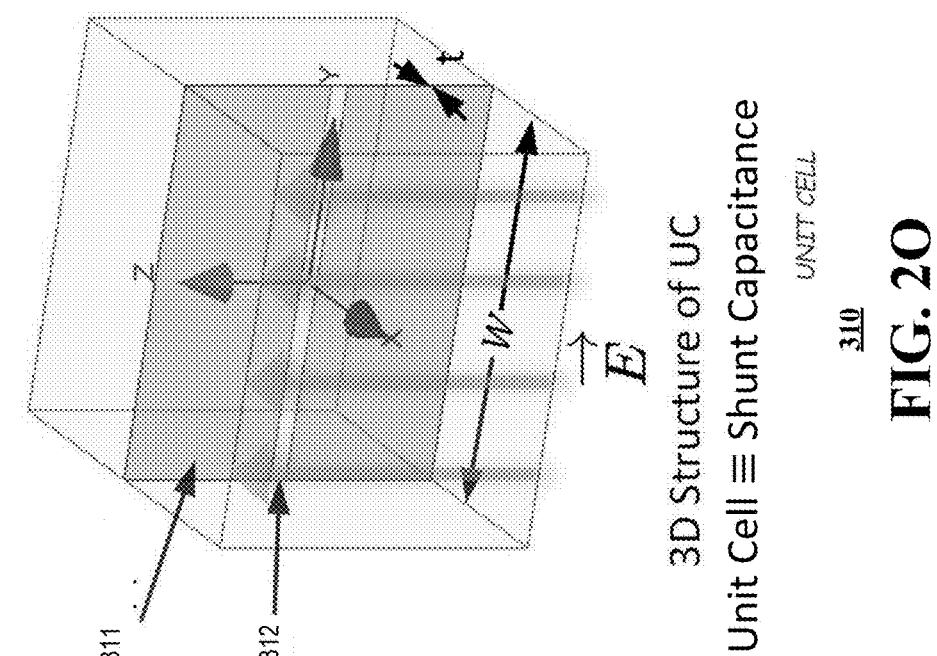
3D Structure of UC
Unit Cell ≡ Shunt Capacitance
UNIT CELL
311
312
<u>310</u>
FIG. 2O

Equivalent Circuit Model $$L \propto 1/s$$

317

318

3D Structure of UC
Unit Cell ≡ Shunt Inductor

315

Equivalent Circuit Model

322

323

3D Structure of UC
Unit Cell ≡ Shunt L&C

320

GUIDING RF CARRIER SIGNAL TOWARD INPUT OF SURFACE CELLS — 326

OBTAINING INFORMATION SIGNAL — 327

ADJUSTING CONTROLLABLE DEVICE ACCORDING TO INFORMATION SIGNAL TO OBTAIN VARIED SURFACE CELL PROPERTY — 328

MODULATING RF CARRIER USING VARIED SURFACE CELL PROPERTIES — 329

RADIATING THE MODULATED RF CARRIER VIA OUTPUT OF SURFACE CELL — 330

<u>325</u>

360

350

600

TUNABLE CELL FOR HIGH-SPEED SURFACE MODULATION

FIELD OF THE DISCLOSURE

The subject disclosure relates to a tunable cell for high-speed surface modulation.

BACKGROUND

Meta-surface structures have been proposed in a context of reconfigurable intelligent surfaces (RIS). Specifically, RIS may be deployed to dynamically control the characteristics of meta-surfaces to reflect RF waveforms towards coverage holes in order to improve coverage. Accordingly, the RIS may be configured to direct and/or redirect reflected signals, e.g., 3GPP signals in their entirety, or perhaps some large segments of such signals, such as frames or subframes, e.g., slots.

BRIEF DESCRIPTION OF THE DRAWINGS

Reference will now be made to the accompanying drawings, which are not necessarily drawn to scale, and wherein:

FIG. 2J is a block diagram illustrating a rear view of an example, non-limiting embodiment of a modulating meta-surface unit cell functioning within the communication network of FIG. 1 in accordance with various aspects described herein.

FIG. 2K is a block diagram illustrating a side view of an example, non-limiting embodiment of a modulating meta-surface unit cell functioning within the communication network of FIG. 1 in accordance with various aspects described herein.

FIG. 2L is a block diagram illustrating a front view of an example, non-limiting embodiment of a modulating meta-surface unit cell functioning within the communication network of FIG. 1 in accordance with various aspects described herein.

FIG. 2O is a perspective view illustrating an example, non-limiting embodiment of a shunt capacitive portion of a unit cell of an intelligent communication surface in accordance with various aspects described herein.

FIG. 2P is a schematic diagram illustrating an example, non-limiting embodiment of an equivalent circuit of the shunt capacitive portion of unit cell of an intelligent communication surface illustrated in FIG. 2O in accordance with various aspects described herein.

FIG. 2Q is a graph illustrating a performance of the example, non-limiting embodiment of the equivalent circuit of the shunt capacitive portion of the unit cell of the intelligent communication surface illustrated in FIG. 2P in accordance with various aspects described herein.

DETAILED DESCRIPTION

Figure 1:
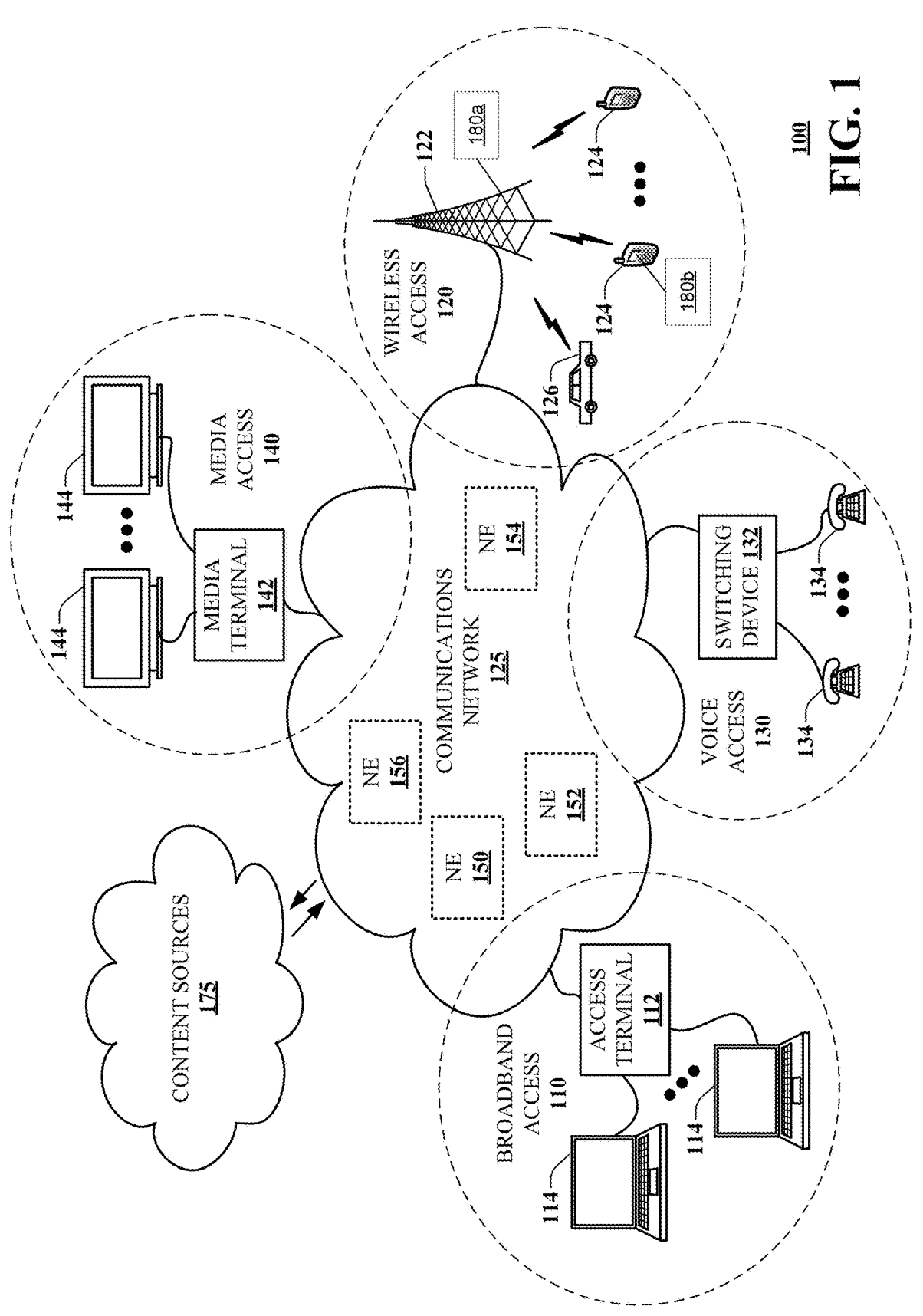
FIG. 1 is a block diagram illustrating an exemplary, non-limiting embodiment of a communications network incorporating an intelligent communication surface in accordance with various aspects described herein.

The subject disclosure describes, among other things, illustrative embodiments for exposing a group of controllable surface cells to an RF carrier signal, for selectively tuning properties of the controllable surface cells according to an information signal and for directly modulating the RF carrier signal according to the varied properties of the group of controllable surface cells. Unlike RIS, which are passive and operate at the slot level, the disclosed devices, systems and processes modulate waveforms at a transmitter, e.g., utilizing simplified waveforms, such as OOK and BPSK. Accordingly, the disclosed modulating meta-surfaces may be viewed as transmitters, which may be active and capable of operating at a symbol level. Other embodiments are described in the subject disclosure.

One or more aspects of the subject disclosure include a process that includes guiding a radio frequency (RF) carrier signal towards an input surface of a first controllable surface cell of an intelligent controllable surface to obtain a guided RF carrier signal. The first controllable surface cell includes a first controllable device in communication with the input surface and an output surface. The process further includes obtaining a first information signal and adjusting the first controllable device according to the first information signal to obtain a first controlled device, wherein a property of the first controllable surface cell is varied according to the first controlled device to obtain a first varied surface cell property. The guided RF carrier signal is modulated responsive to the first varied surface cell property to obtain a first modulated RF carrier signal, which is radiated via the output surface of the first controllable surface cell.

One or more aspects of the subject disclosure include a device that includes a radio frequency (RF) distributor configured to guide an RF carrier signal to obtain a guided RF carrier signal and multiple controllable surface cells of an intelligent controllable surface. The multiple controllable surface cells include multiple input surfaces in communication with the RF distributor and exposed to the guided RF carrier signal and multiple output surfaces. The device further includes multiple tunable devices associated with the multiple controllable surface cells, wherein the multiple tunable devices are adapted to vary properties of the multiple controllable surface cells. The device further includes a modulation controller in communication with the multiple tunable devices, wherein the modulation controller is configured to modulate the guided RF carrier according to variation of the properties of the multiple controllable surface cells to obtain a modulated RF carrier signal. The device further includes multiple emitters in communication with the multiple output surfaces, wherein the multiple emitters are configured to radiate the modulated RF carrier signal.

One or more aspects of the subject disclosure include an intelligent controllable surface that includes multiple controllable surface cells of an intelligent controllable surface. The intelligent controllable surface includes multiple input surfaces in communication with a waveguide, wherein the multiple input surfaces are configured to receive an RF carrier signal via the waveguide. The intelligent controllable surface further includes multiple output surfaces and multiple control terminals in communication with the multiple controllable surface cells, wherein the multiple control terminals are configured to receive an information signal. The intelligent controllable surface further includes multiple controllable devices in communication with the multiple control terminals, wherein the multiple controllable devices are configured to control scattering parameters of the multiple controllable surface cells responsive to the information signal. The scattering parameters, in turn, impress a direct modulation upon the RF carrier signal to obtain a first modulated RF carrier signal.

According to the disclosed devices, processes and systems, a meta-surface includes multiple tunable elements that may be tuned or otherwise adjusted or configured to impress a modulation upon an RF carrier signal. In at least some embodiments, the tunable elements may be identical in construction, thus representing a concept of a unit cell, or a unit tunable cell that may be incorporated into a modulating meta-surface. A unit cell may be tunable according to a baseband signal, e.g., an input and/or output (I/O) signal. For example, a baseband I/O may be configured to bias a tunable element such as a varactor, or other tunable device, e.g., tunable reactance, within a unit-cell of a meta-surface. The unit cell may include a baseband controller adapted to change, alter, vary and/or otherwise adjust a property of the tunable element, e.g., by varying a bias voltage and/or current, to modulate data onto a wireless carrier signal, e.g., an RF carrier, to produce a modulated wireless signal. In at least some embodiments, a unit cell of a modulating meta-surface may include a single tunable element configured to vary a transmissive and/or reflective property of the unit cell to directly modulate an RF carrier signal. A meta surface may be configured with one or more groups of such unit cells that may be controlled and/or modulated according to an input baseband signal. At least some of the unit cells may be controlled and/or modulated differently, e.g., modulated according to different information and/or modulated according to a different modulation scheme, e.g., some being modulated using on-off keying, while others being modulated using BPSK. In at least some embodiments, a tunable element includes a resonant frequency that may be varied such that the transmission and/or reflection characteristics of the unit cell change, resulting in amplitude and/or phase modulation of the RF carrier.

In at least some embodiments, tunable elements of the unit cells and/or surrounding structure are capable of being modulated at a symbol rate, which may operate at one or multiple, e.g., tens or even hundreds of Gbps. Beneficially, the unit cells may incorporate relatively simple structures, which may include passive devices, e.g., at times, having no active devices, which may operate at multi-Gbps rates. The unit cells may offer relatively low losses when operated at RF carrier frequencies, up to and including millimeter wave bands and beyond. The tunable element may be selected such that a baseband IO signal can switch it at high (Gbps) speeds. Namely, the time-constant of a baseband IO resistance with a reactance of the tunable element of a unit cell may be small relative to a symbol period.

Millimeter wave and (sub-) THz frequencies offer unprecedented wide bandwidths and large numbers of antenna elements. However, analog-to-digital (ADC) power consumption increases approximately linearly with sampling rate and exponentially in relation to the number of bits per sample making a large number of digital transmission chains prohibitive. Consequently, hybrid analog/digital beamforming may be used to reduce the number of digital ports. Such forms of hybrid analog/digital beamforming necessitate "beam management," which complicates and thus practically prevents many use cases, e.g., mobility, reliability, agility.

Beneficially, the techniques disclosed herein permit fully digital, linearly scalable, ultra massive MIMO at ultra-low power and ultra-low cost. A basic approach to MIMO at ultra-low power and ultra-low cost are disclosed in U.S. patent application Ser. No. 16/988,103, now issued as U.S. Pat. No. 11,296,742, entitled "Ultra-Low-Power Millimeter-Wave to Baseband Receiver Module for Scalable Massive MIMO," the contents of which are incorporated by reference in their entirety. Possible receiver structures were disclosed in U.S. patent application Ser. No. 17/102,662, now issued as U.S. Pat. No. 11,303,347, entitled "Low-Power, Self-Referenced Receiver" and U.S. patent application Ser. No. 17/103,152, now issued as U.S. Pat. No. 11,121,896, entitled "Low-Resolution, Low-Power, Radio Frequency Receiver," the contents of which are incorporated by reference in their entireties. It is understood that the disclosures of the aforementioned applications and patents may be combined with the various techniques disclosed herein, e.g., utilizing the disclosed receiver structures with the modulating meta-surface structure. The present disclosure is directed towards transmitter structures that may be utilized in applications, such as those disclosed in the related applications.

By way of example, an RF carrier emitted from a localized source produces a phase-coherent local oscillator, which may be directed for incidence upon a modulating meta-surface. The modulating meta-surface may include a number of unit cells, e.g., M unit-cells, which may directly modulate the incident RF carrier in magnitude and/or phase. In at least some embodiments, the modulating meta-surface may reside between two plates of a parallel plate waveguide to efficiently guide the carrier to the modulating meta-surface and to reduce the required height of the modulating meta-surface, thereby permitting stacked configurations of multiple parallel plate modulating meta-surfaces to achieve higher element count, to comply with compact form factors, and/or provide beamforming, e.g., elevation-beamforming. The modulating meta-surface may be modulated with digital signals, including binary and multi-level signals that can be routed to modulated meta-surface, e.g., to the parallel plate waveguide structures.

The disclosed techniques will facilitate deployments of otherwise complex and costly millimeter wave systems, allowing for ultra-low cost and ultra-low power deployments, rendering such deployments as sustainable and affordable. The disclosed techniques render state-of-the-art hybrid analog/digital systems fully digital, thereby opening up new revenue streams through new use cases and applications. It also makes MIMO systems with many antennas scalable and predictable making true massive MIMO a reality.

Referring now to FIG. 1, a block diagram is shown illustrating an example, non-limiting embodiment of a system 100 in accordance with various aspects described herein. For example, system 100 can facilitate in whole or in part exposing a group of controllable surface cells to an RF carrier signal, for selectively tuning properties of the controllable surface cells according to an information signal and for directly modulating the RF carrier signal according to the varied properties of the group of controllable surface cells. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

In at least some embodiments, the communications network 125 may include one or more intelligent communication surfaces 180a, 180b. The intelligent communication surfaces may be configured to expose a group of controllable surface cells of the intelligent communication surfaces 180a, 180b to an RF carrier signal, to selectively tuning properties of the controllable surface cells according to an information signal and to directly modulating the RF carrier signal according to the varied properties of the group of controllable surface cells.

Figure 2A:
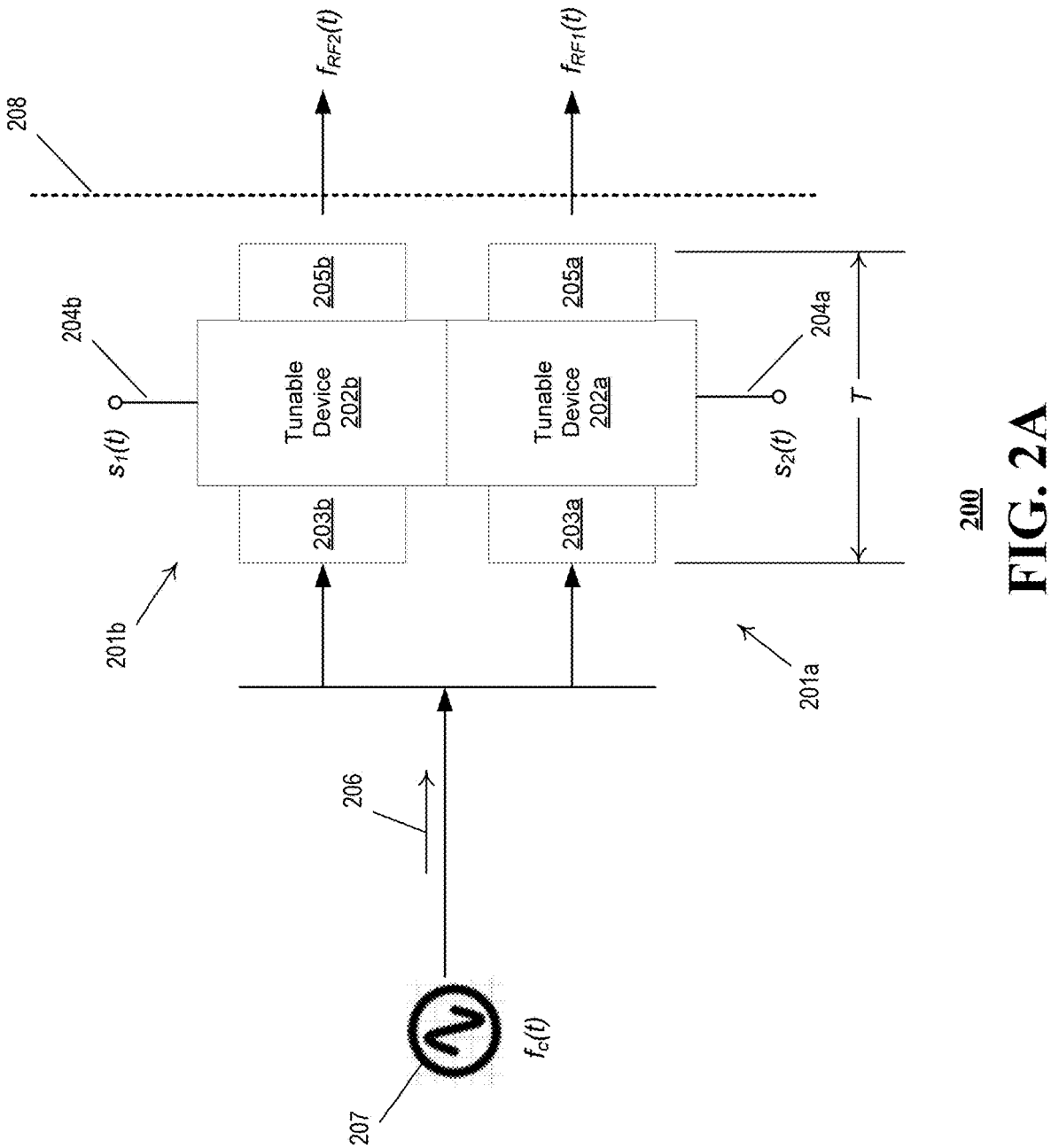
FIG. 2A is a block diagram illustrating an example, non-limiting embodiment of a tunable cell for high-speed surface modulation functioning within the intelligent communication surface of the communication network of FIG. 1 in accordance with various aspects described herein.

FIG. 2A is a block diagram illustrating an example, non-limiting embodiment of an intelligent communication surface 200 functioning within the communication network of FIG. 1 in accordance with various aspects described herein. The intelligent communication surface 200 includes a first tunable cell 201a configured for high-speed modulation of a radio frequency (RF) signal. The first tunable cell 201a includes a first tunable device 202a having a first input port 203a and a first output port 205a. According to the illustrative example, the first input port 203a includes a waveguide port configured to receive at least a portion of an RF signal 206 provided by an RF signal source 207.

The first tunable cell 201a further includes a first modulation terminal 204a configured to receive a first modulation control signal from a modulation controller (not shown). In at least some embodiments, the first tunable device 202a is configured to perform a first tuning and/or a de-tuning process responsive to the first modulation control signal. The first tunable device 202a is further adapted to modulate a first received portion of the RF signal 206 according to the first tuning and/or the de-tuning process to obtain a first modulated RF signal $f_{RF1}(t)$. In at least some embodiments, the first modulated RF signal $f_{RF1}(t)$ exits the first tunable cell 201a via the first output port 205a. For example, the first output port 205a may include a first radiating port configured to direct and/or otherwise propagate the first modulated RF signal $f_{RF1}(t)$.

It is understood that the first tunable cell 201a may be incorporated into the intelligent communication surface 200. According to the illustrative example, the intelligent communication surface 200 defines at least one output surface 208. For example, the first tunable cell 201a may be arranged such that the first output port 205a, i.e., a first radiating port, directs the first modulated RF signal $f_{RF1}(t)$ in an outward direction with respect to the output surface 208.

In at least some embodiments, the first tunable cell 201a may be considered as a building block, e.g., a unit cell, of the intelligent communication surface 200. It is understood that, in such configurations, the first tunable cell 201a may be incorporated with other tunable cells, e.g., with a second tunable cell 201b. According to the illustrative example, the second tunable cell 201b is constructed in a similar manner, e.g., including a second tunable device 202b having a second input port 203b and a second output port 205b. According to the illustrative example, the second input port 203b includes a waveguide port configured to receive at least a portion of the RF signal 206. The second tunable cell 201b further includes a second modulation terminal 204b configured to receive a second modulation control signal from the modulation controller (not shown). In at least some embodiments, the second tunable device 202b is configured to perform a second tuning and/or a de-tuning process responsive to the second modulation control signal. The second tunable device 202b is further adapted to modulate a second received portion of the RF signal 206 according to the second tuning and/or the de-tuning process to obtain a second modulated RF signal $f_{RF2}(t)$.

According to intelligent communication surfaces 200 that include multi-tunable cell arrangements having multiple tunable cells 201a, 201b, generally 201, it is envisioned that each of the tunable cells 201 may be controlled by a different respective modulation control signals, i.e., $S_1(t) \neq S_2(t)$. Alternatively, or in addition, at least some, and possibly all, of the tunable cells 201 may be controlled by a common respective modulation control signal, i.e., $S_1(t) = S_2(t)$.

It is understood that in at least some embodiments, the RF signal source 207 is coupled to the first and/or the second input ports 203a, 203b via a signal guiding structure, such as a coupling waveguide. The coupling waveguide may include an electrically conductive waveguide, a substantially non-conductive waveguide, e.g., a dielectric waveguide, or a combination of conducting and substantially non-conducting waveguide components. Coupling waveguide structures may include, without limitation, hollow waveguides, e.g., ducts, such as hollow rectangular waveguides, coplanar waveguides, coaxial waveguides and/or dielectric waveguides, including light pipes and/or optical fibers. Alternatively, or in addition, the signal guiding structure may include a coupling transmission line, such as a microstrip transmission line, a stripline transmission line, including balanced and/or differential transmission line structures.

The RF signal source 207, in turn, may be adapted to generate time varying signals. Without limitation, the time varying signals may include sinusoid signals residing in one or more identifiable bands of the electromagnetic spectrum, such as radio frequency bands, e.g., ELF, SLF, ULF, VLF, LF, MF, HF and VHF radio bands, microwave frequency bands, e.g., UHF and SHF bands, millimeter wave bands, e.g., EHF bands, terahertz bands, and the like. In at least some embodiments, a single RF signal source 207 is configured to provide inputs to a group of tunable cells 201a, 201b, generally 201. Alternatively, or in addition, multiple RF signal sources 207 are provided, with each RF signal source 207 driving a respective group of tunable cells 201. In at least some multi-RF source configurations, the RF signal sources 207 may be synchronized, e.g., according to a phase lock loop, or similar feedback structure to adjust operational frequencies of the multiple RF signal sources 207 for coherent operation.

The tunable cells 201 may define a thickness value, e.g., determined for the first tunable cell 201a as a distance or thickness, T, between the first input port 203a and the first output port 205*a*. In at least some embodiments, the tunable cells 201 are aligned. Such alignments of tunable cell 201*a* may include one-dimensional (1D) alignments, e.g., linear arrangements. Alternatively, or in addition, the alignments may include two-dimensional (2D) alignments, e.g., planar arrangements as may be realized according to grid-like arrangements of tunable cells 201. Any of the aforementioned arrangements may include uniform spacing and/or separation between at least some of the tunable cells 201, non-uniform spacing and/or separation or combinations thereof. It at least some embodiments, the alignments of tunable cells 201*a* may include three-dimensional (3D), e.g., conformal arrangements as may extend over a three-dimensional structure, such as the surface of a vehicle, e.g., a drone, an antenna tower, and/or a building.

Figure 2B:
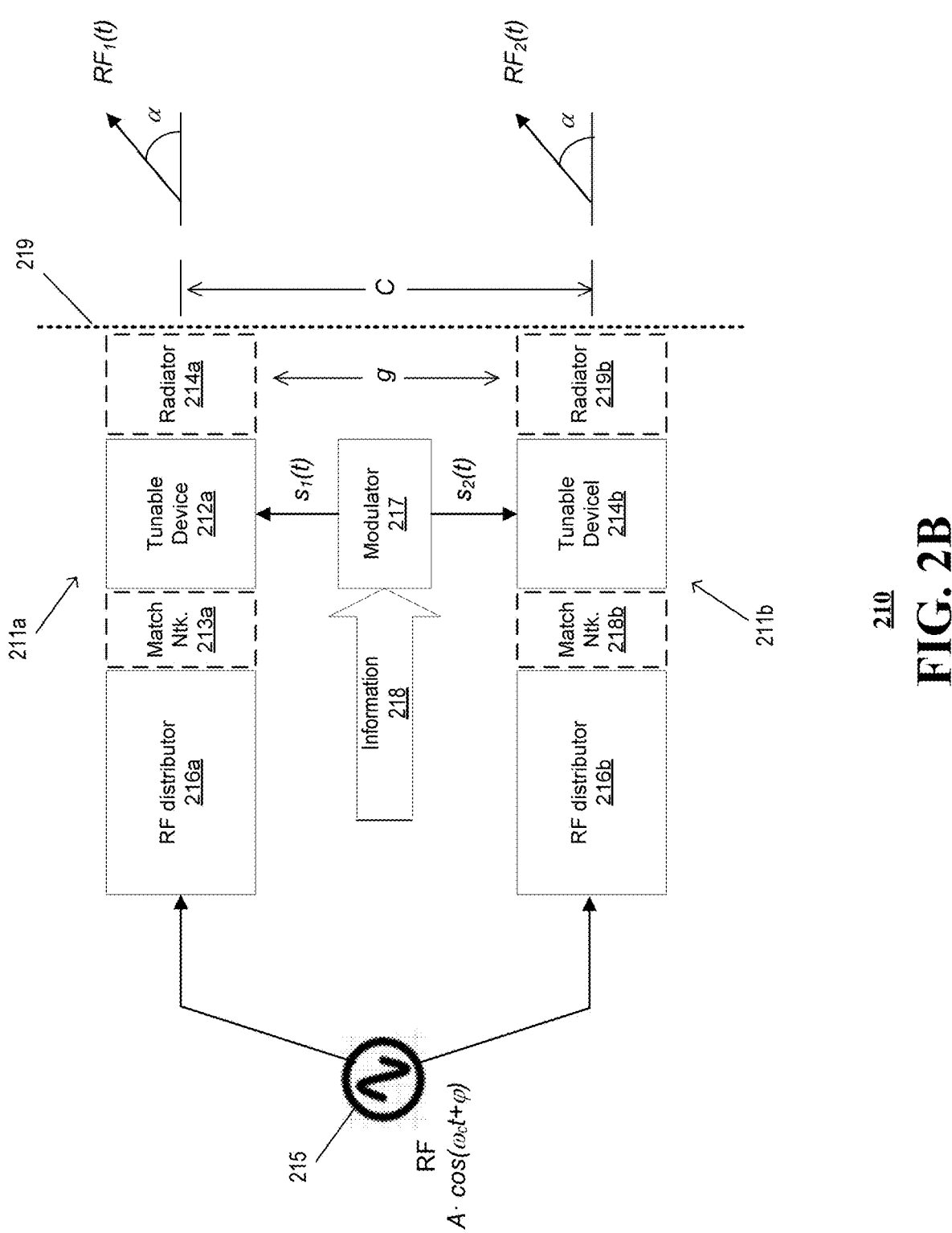
FIG. 2B is a block diagram illustrating an example, non-limiting embodiment of an intelligent communication surface system functioning within the communication network of FIG. 1 in accordance with various aspects described herein.

FIG. 2B is a block diagram illustrating an example, non-limiting embodiment of an intelligent communication surface system 210 functioning within the communication network 100 of FIG. 1 in accordance with various aspects described herein. The example intelligent communication surface system 210 includes a group of intelligent surface cells including a first intelligent surface cell 211*a* and a second intelligent surface cell 211*b*. The first intelligent surface cell 211*a* includes a first tunable device 212*a*. Likewise, the second intelligent surface cell 211*b* includes a second tunable device 212*b*. The first and second tunable devices 212*a*, 212*b*, generally 212, are coupled to a modulator 217. The modulator 217 receives information 218, generates one or more modulation control signals, e.g., $S_1(t)$, $S_2(t)$ adapted to tune and/or de-tune the respective tunable devices 212.

According to the illustrative embodiment, the first tunable device 212*a* receives a first RF signal from an RF signal source 215 via a first RF distributor 216*a*. The second RF signal may include an RF carrier signal, e.g., a sinusoidal signal operating within a frequency band according to an intended application of the intelligent communication surface system 210. In at least some embodiments, the first intelligent surface cell 211*a* includes a first matching network 213*a* (shown in phantom) disposed between the first RF distributor 216*a* and the first tunable device 212*a*. It is understood that the first RF distributor 216*a* may include an RF signal guiding device and/or system, such as a waveguide and/or transmission line operating at a corresponding characteristic impedance. In such instances, the first matching network 213*a* may be configured to provide a suitable impedance match to the first tunable device 212*a* as may be determined according to a scattering parameter ("S-parameter") value, such as an $S_{11}$ or return loss value.

Likewise, the second tunable device 212*b* receives a second RF signal from the RF signal source 215 via a second RF distributor 216*b*. The second RF signal may include a second RF carrier signal, e.g., a sinusoidal signal operating within a frequency band according to an intended application of the intelligent communication surface system 210. In at least some embodiments, the first and second RF signals are substantially the same, e.g., coherent signals as may be obtained from a common RF signal source 215. The second intelligent surface cell 211*b* may also include a second matching network 213*b* (also shown in phantom) disposed between the second RF distributor 216*b* and the second tunable device 212*b*. It is understood that in at least some embodiments, the second RF distributor 216*b* may be similar to the first RF distributor 216*a*, e.g., possibly sharing a common waveguide structure, such as a parallel plate waveguide. The second matching network 213*b* may be configured to provide a suitable impedance match to the second tunable device 212*b*.

In at least some embodiments, the first surface cell 211*a* is in communication with a first wireless radiator 214*a* and the second surface cell 211*b* is in communication with a second wireless radiator 214*b* (both shown in phantom). The wireless radiators 214*a*, 214*b*, generally 214, may include antenna devices, such as aperture antennas, horn antennas, wire antennas, e.g., dipole antennas, crossed dipole antennas, loop antennas, and so on. In at least some embodiments, the wireless radiators 214 are simple apertures determined at least in part according to a geometry of an outward-facing side or surface of the tunable devices 212*a*, 212*b*, generally 212. It is envisioned that in at least some embodiments, the outward facing sides or surfaces of the tunable devices 212 and/or the wireless radiators 214*a*, 214*b*, generally 214, may define an intelligent communication surface 219.

Each of the tunable devices 212 and/or wireless radiators 214, when provided, may emit a portion of an intelligent communication surface signal. For example, the first tunable device 212*a* and/or first wireless radiator 214*a* may emit a first wireless component, $RF_1(t)$, of the intelligent communication surface signal. Likewise, the second tunable device 212*b* and/or second wireless radiator 214*b* may emit a second wireless component, $RF_2(t)$, of the intelligent communication surface signal. In at least some embodiments, first and second tunable devices 212 and/or wireless radiators 214 may form a surface array adapted to emit and/or otherwise direct the radiated wireless components $RF_1(t)$, $RF_2(t)$ according to a preferred direction and/or directivity. For example, in at least some embodiments, a phase offset may be introduced between at least some of the radiated wireless components to impart a directionality to the surface modulated signal. Alternatively, or in addition, one or more of an amplitude value or taper, an element separation, g, or an element spacing, C, or a phase offset may be applied to the group of tunable devices 212 and/or wireless radiators 214 to obtain a direction and/or directionality with regard to the radiated wireless components.

Figure 2C:
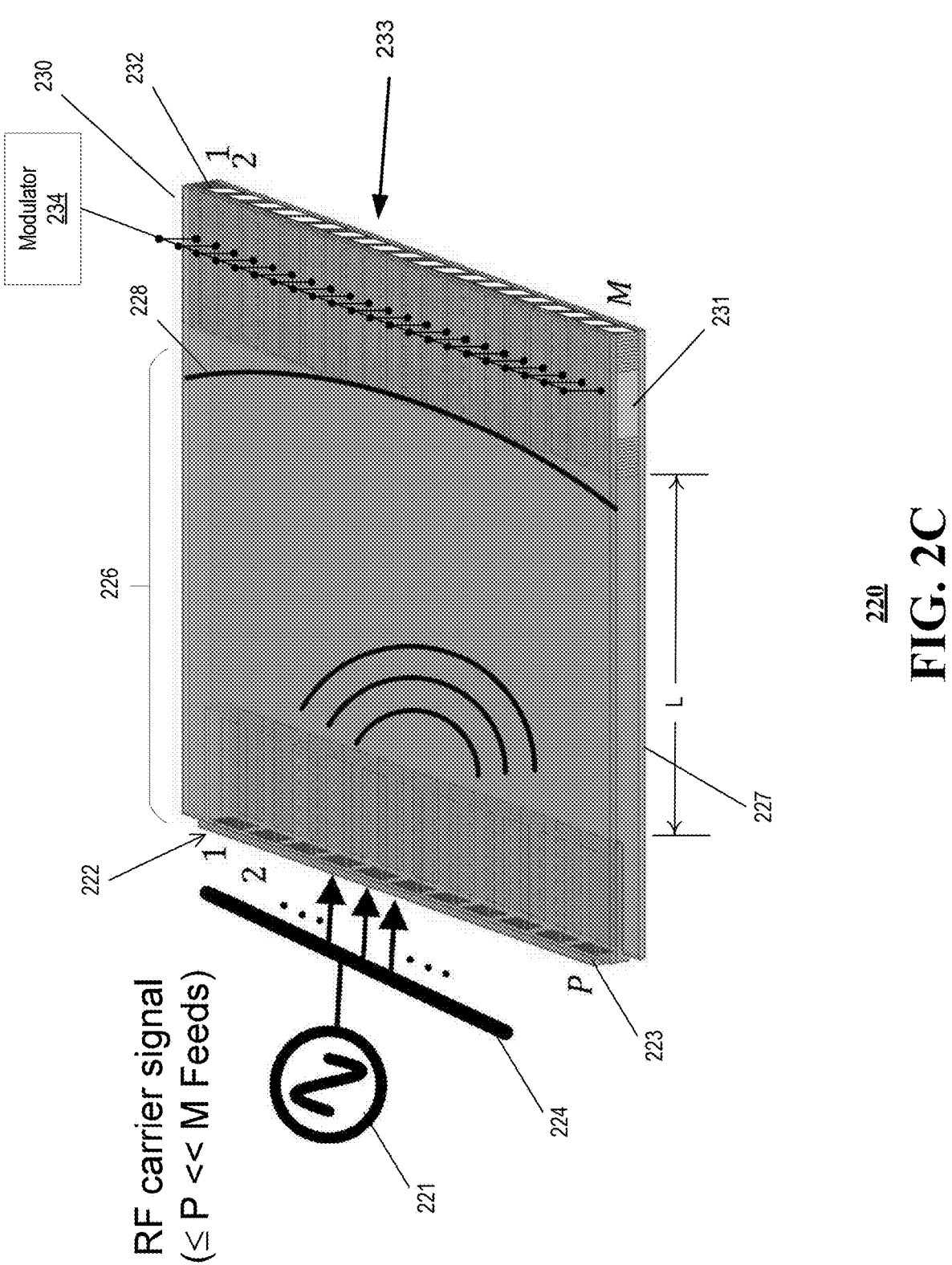
FIG. 2C is a block diagram illustrating an example, non-limiting embodiment of a meta surface functioning within the communication network of FIG. 1 in accordance with various aspects described herein.

FIG. 2C is a block diagram illustrating an example, non-limiting embodiment of a meta-surface communication system 220 functioning within the communication network 100 of FIG. 1 in accordance with various aspects described herein. The meta-surface communication system 220 includes a local oscillator 221 providing an RF carrier signal. In at least some embodiments, the local oscillator 221 to an RF wave-launching array 222 via a local oscillator distribution network 224. The RF wave-launching array 222 includes a first array of P of wave-launching elements 223. In at least some embodiments, the local oscillator 221 provides an RF carrier that may be amplified and/or power split. For example, an RF carrier may be emitted from the local oscillator 221, or multiple sources, e.g., P sources or local oscillators to produce a phase-coherent local oscillator which is incident upon the modulating meta-surface 233. This is a form of spatial feeding which is low-loss and simple to fabricate. The example modulating meta-surface 233 includes a number, M, unit-cells, which may directly modulate the incident RF carrier in magnitude and/or phase.

The example meta-surface communication system 220 further includes an RF carrier distributor 226 configured to direct the RF carrier signal from the local oscillator distribution network 224 toward a meta-surface modulator array 230, including a second array of M unit surface cells 231. In at least some embodiments, the number, M, of unit surface cells 231 is much larger than the number, P, of wave-launching elements 223, i.e., P<<M.

The unit surface cells 231 are coupled to and/or otherwise include a radiating element 232. The radiating element may include an aperture, e.g., exposing a surface of the unit surface cells 231. Alternatively, or in addition, the radiating elements may include an aperture, such as an open waveguide, a horn, and/or a wire structure, such as a dipole, a crossed dipole, and/or a loop wire structure. Wire structures may include conductive structures disposed upon insulating substrates, e.g., printed circuit board structures. In at least some embodiments, the radiating elements 232 and/or an open ends of the unit surface cells 231 may define a modulating meta-surface 233. It is worth noting here that the example modulating meta surface 233 defines a substantially linear area extending in width across at least a number of radiating elements multiplied by a width, W, of each radiating element 232 and in height, by a height, H, of a single radiating element 232. It is envisioned that other surface shapes and/or sizes are possible by extending and/or otherwise adapting a configuration of the unit surface cells 231 and/or radiating element 232. For example, in at least some embodiments more than one of the example meta-surface communication system 220 may be stacked and/or otherwise layered, e.g., having overlapping layers of parallel plate waveguides 227.

In at least some embodiments, the wave-launching array 222 launches the RF carrier signal, which is transported by a guiding structure such as the example parallel plate waveguide 227, over a distance, L, to an input of the meta-surface modulator array 230. The parallel plate waveguide may be configured to efficiently guide the carrier to the meta-surface and to reduce the required height of the modulating meta-surface, e.g., to a height, $H \leq \lambda_0/2$, in which $\lambda_0$ represents a wavelength of the RF carrier 221. The distance L may be sufficient to obtain a predetermined wavefront 228, e.g., a substantially parallel, wavefront 228 or coherent wavefront 228 at the input to the meta-surface modulator array 230. In at least some embodiments, the distance L is greater than or equal to a coherence wavelength to obtain a coherent wavefront 228 at the input to the meta-surface modulator array 230.

At least some of the unit surface cells 231 and up to substantially all of the unit cells 213 may be in communication, e.g., electrically coupled, to a modulation controller 234. The modulation controller 234 may provide a modulation control signal to one or more of the unit surface cells 231. In at least some embodiments, the modulation signals may be independent for at least some, and up to all of the unit surface cells 231. Alternatively, the modulation signals may be dependent for at least some and up to all of the unit surface cells 231. Dependence may include the modulation signals having a predetermined relationship, e.g., according to an amplitude, a frequency and/or a phase. In at least some embodiments, dependence includes applying substantially the same modulation signal to some and up to all of the unit surface cells 231. It is understood that in at least some embodiments, the modulation signal may be determined according to information, such that a surface modulated output wireless signal conveys the information to a remote destination and/or recipient device. It is understood that the example meta-surface modulator array 230 may be combined with similar and/or different stacked modulating meta-surfaces, e.g., stacked in height and/or in width, to achieve higher element count and/or provide beamforming, e.g., elevation-beamforming for horizontally stacked parallel plate meta-surface modulator array 230.

Figure 2D:
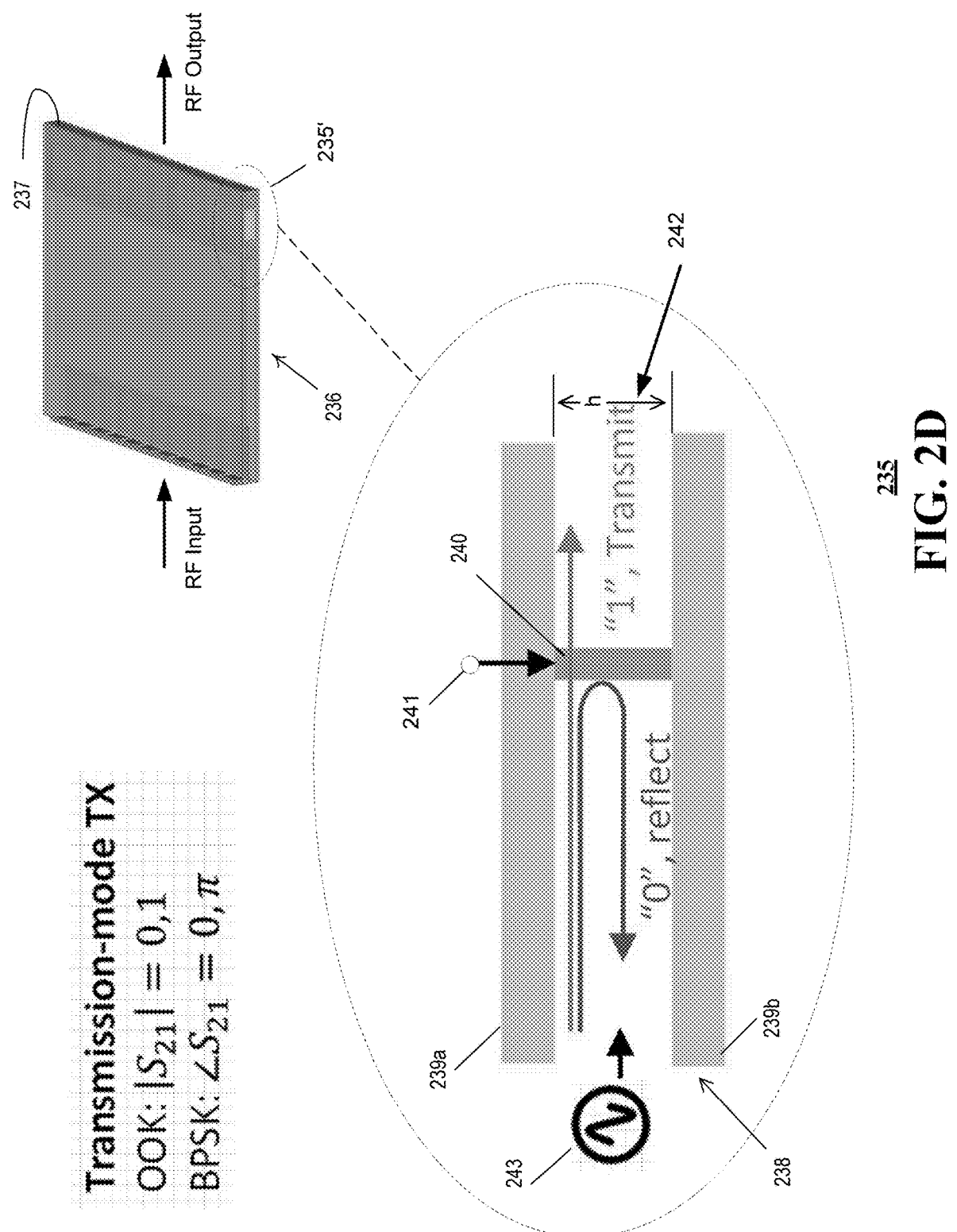
FIG. 2D is a block diagram illustrating an example, non-limiting embodiment of a modulating meta-surface, transmissive unit cell functioning within the communication network of FIG. 1 in accordance with various aspects described herein.

FIG. 2D is a block diagram illustrating an example, non-limiting embodiment of a transmissive unit cell 235 of a modulating meta-surface functioning within the communication network 100 of FIG. 1 in accordance with various aspects described herein. A drawing insert illustrates a location of the example transmissive unit cell 235' positioned along a modulating meta-surface 237 of an example transmissive modulating meta-surface communication system 236. The transmissive unit cell 235 includes an RF channel 238 defining an open space, e.g., a channel, extending along a vertical direction. The example RF channel 238 is formed by a parallel plate waveguide including an upper electrically conducting plate 239a and a lower electrically conducting plate 239b. The electrically conducting plates 239a, 239b, generally 239 are positioned according to a parallel arrangement, in which the electrically conducting plates 239 are horizontally spaced apart by a separation distance, h.

The transmissive unit cell 235 further includes a controllable meta-surface element 240 or atom. The controllable meta-surface element 240 extends between the electrically conducting plates 239, along a surface that may be substantially perpendicular to an axis of the RF channel 238, such that the controllable meta-surface element 240 occludes a portion of an opening of the RF channel 238 and up to substantially the entire opening of the RF channel 238 associated with and/or otherwise allocated to the transmissive unit cell 235.

The controllable meta-surface element 240 includes a modulator input terminal 241 configured for attachment to a signal lead, e.g., a wire, an electrical connector pin or contact, and/or a conductive circuit channel or etch. In operation, the controllable meta-surface element 240 receives a modulation control signal from a modulation controller (not shown). The controllable meta-surface element 240 is configured to modify, e.g., modulate, an RF carrier signal 243 propagating along the RF channel 238. For example, according to a binary modulation application in which the modulation control signal represents a digital "0" or "1" according to input information, the controllable meta-surface element 240 may be configured to pass the RF carrier signal 243, e.g., corresponding to a modulation control signal representing a digital "1" or reflect the RF carrier signal 243, e.g., corresponding to a modulation control signal representing a digital "0." The directly modulated carrier signal may be directed out of an aperture 242 of the transmissive unit cell 235.

A modulating meta-surface 230 (FIG. 2C) including the example transmissive unit cell 235, may be referred to as a transmission-mode modulator, in which a scattering parameter, $S_{21}$, is may be modulated. Accordingly, the transmissive unit cell 235 may be configured to apply a direct modulation to the RF carrier signal 243. In at least some embodiments, the controllable meta-surface element 240 may apply a direct modulation, which includes on-off-keying (OOK) modulation. For example, OOK modulation may vary a magnitude of the transmission coefficient, $|S_{21}|$, approximately between 0 and 1 according to the modulation control signal value. Alternatively, or in addition, the controllable meta-surface element 240 may apply a direct modulation, which includes a binary phase shift keying (BPSK) modulation. For example, BPSK modulation may vary a phase of the transmission coefficient, $\angle S_{21}$, approximately between 0 and $\pi$ radians according to the modulation control signal value.

Figure 2E:
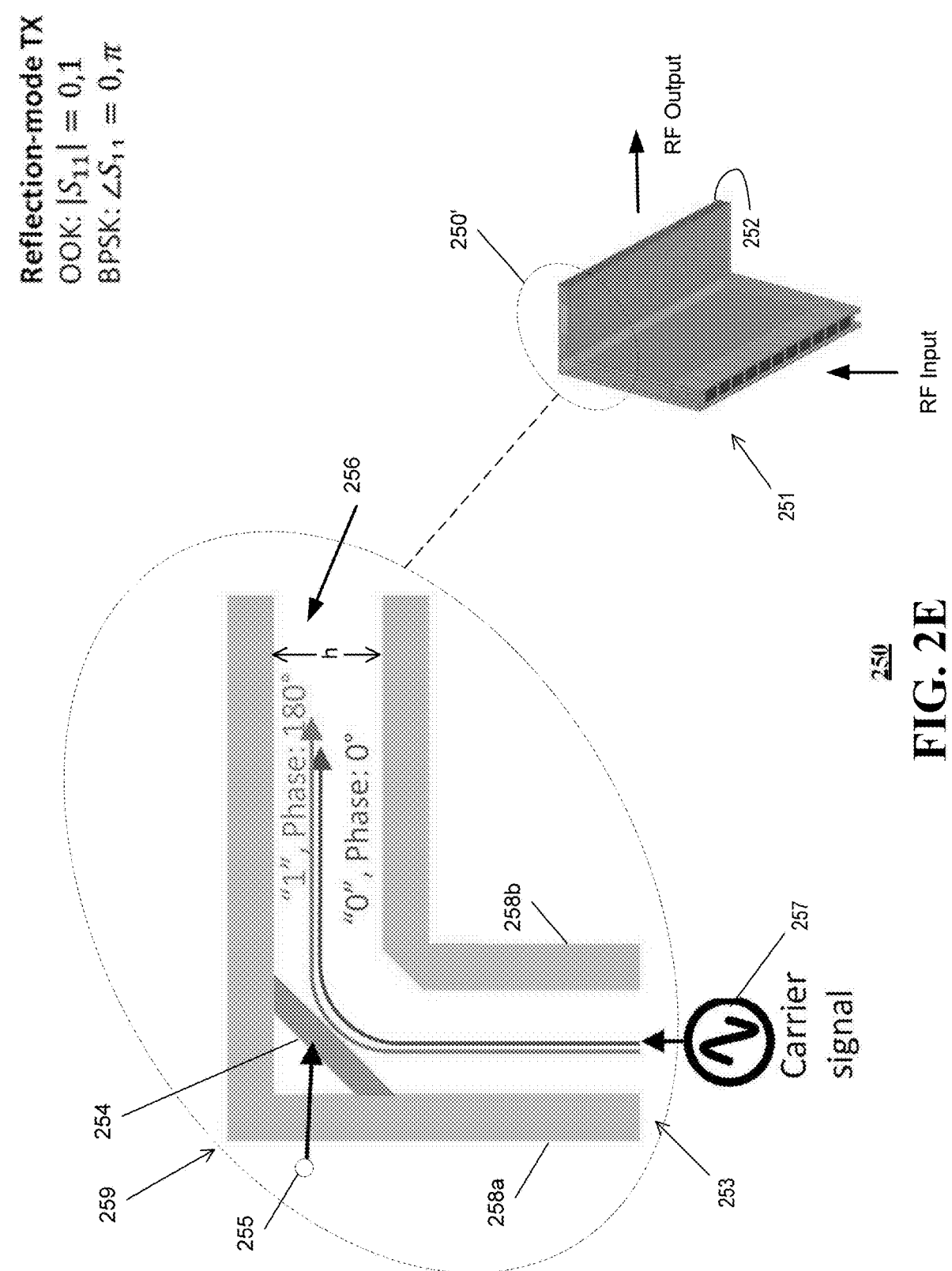
FIG. 2E is a block diagram illustrating an example, non-limiting embodiment of a modulating meta-surface, reflective unit cell functioning within the communication network of FIG. 1 in accordance with various aspects described herein.

In at least some embodiments, the electrically conducting plates 239 of the parallel plate waveguide may be optionally bent to form a reflection-mode transmitter, in which a different scattering parameter, e.g., $S_{11}$, is modulated. FIG. 2E is a block diagram illustrating an example, non-limiting embodiment of a modulating meta-surface, reflective unit cell 250 functioning within the communication network 100 of FIG. 1 in accordance with various aspects described herein. A drawing insert illustrates a location of the example reflective unit cell 250' positioned along a modulating meta-surface 252 of an example reflective meta-surface communication system 251. The reflective unit cell 250 includes an RF channel 253 defining an open space, e.g., a channel, extending towards a bent portion, e.g., a right-angle bend 259. The example RF channel 253 is formed by a parallel plate waveguide including a first electrically conducting plate 258a and an electrically conducting plate 258b. The bent, electrically conducting plates 258a, 258b, generally 258 are positioned according to a bent, parallel arrangement, in which the bent, electrically conducting plates 258 are spaced apart by a separation distance, h.

The reflective unit cell 250 further includes a controllable meta-surface element 254 or atom. The controllable meta-surface element 254 extends at a bent portion of one of the bent, electrically conducting plates 258, presenting an angled surface that may be angled, e.g., at an approximate 45 deg. angle, to an axis of the RF channel 253, such that the controllable meta-surface element 254 may reflect at least a portion of the RF channel 238.

The controllable meta-surface element 254 includes a modulator input terminal 255 configured for attachment to a signal lead, e.g., a wire, an electrical connector pin or contact, and/or a conductive circuit channel or etch. In operation, the controllable meta-surface element 254 receives a modulation control signal from a modulation controller (not shown). The controllable meta-surface element 254 is configured to modify, e.g., modulate, an RF carrier signal 257 propagating along the RF channel 253. For example, according to a binary modulation application in which the modulation control signal represents a digital "0" or "1" according to input information, the controllable meta-surface element 254 may be configured to reflect the RF carrier signal 257, e.g., corresponding to a modulation control signal representing a digital "1" or prevent reflection of the RF carrier signal 257, e.g., corresponding to a modulation control signal representing a digital "0." The directly modulated carrier signal may be directed out of an aperture 256 of the reflective unit cell 250.

Accordingly, the reflective unit cell 250 may be configured to apply a direct modulation to the RF carrier signal 257. In at least some embodiments, the controllable meta-surface element 254 may apply a direct modulation, which includes on-off-keying (OOK) modulation. For example, OOK modulation may vary a magnitude of the transmission coefficient, $|S_{21}|$, approximately between 0 and 1 according to the modulation control signal value. Alternatively, or in addition, the controllable meta-surface element 254 may apply a direct modulation, which includes a binary phase shift keying (BPSK) modulation. For example, BPSK modulation may vary a phase of the transmission coefficient, $\angle S_{21}$, approximately between 0 and 1 radians according to the modulation control signal value.

Figure 2F:
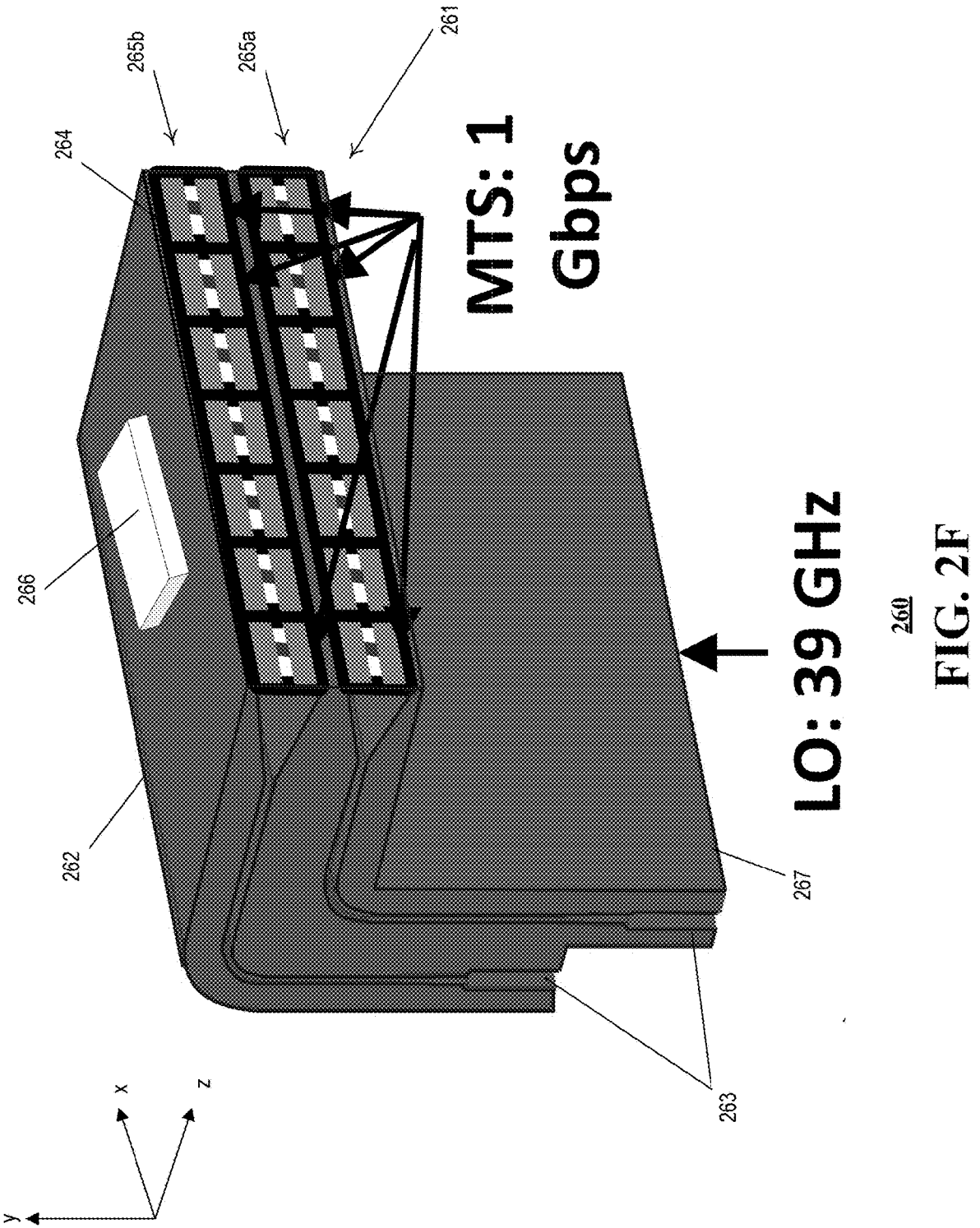
FIG. 2F is a block diagram illustrating an example, non-limiting embodiment of a modulating meta-surface communicator functioning within the communication network of FIG. 1 in accordance with various aspects described herein.

FIG. 2F is a block diagram illustrating an example, non-limiting embodiment of a meta-surface communicator 260 functioning within the communication network 100 of FIG. 1 in accordance with various aspects described herein. The meta-surface communicator 260 includes a housing 262 having an input end or portion 267 configured to receive a local oscillator signal along a y-direction. In at least some embodiments, the housing 262 includes and/or otherwise defines an RF signal path 263, e.g., directing a received local oscillator signal towards an exposed surface 264. The meta-surface communicator 260 also includes a modulating meta-surface 261. According to the illustrative example, the modulating meta-surface 261 includes a first modulating meta-surface array 265a and a second modulating meta-surface array 265b, residing in an x-y plane according to a stacked arrangement, e.g., stacked along a y-direction. Each of the first and second modulating meta-surface arrays 265a, 265b, generally 265, includes a linear array of unit cells 264 extending along an x-direction.

The housing 262 includes an RF distributor configured to channel and/or otherwise direct or transport the local oscillator signal from the input portion 267 towards the unit cells 264 of the modulating meta-surface arrays 265. The example housing 262 includes an approximate 90 deg. bend configured to re-direct a y-directed local oscillator signal to a z-directed local oscillator signal, which illuminates the unit cells 264 of the meta surface arrays 265.

The example meta-surface communicator 260 also includes a modulation controller 266. The modulation controller 266 is in communication with, e.g., electrically coupled to each of the unit cells 264 of the modulating meta-surface arrays. The modulation controller 266 is configured to provide a modulation control signal to each of the unit cells 264, which, in turn, are configured to modulate a respective portion of the local oscillator signal according to the respective modulation control signal. In at least some embodiments, the modulation is a direct modulation, e.g., OOK and/or BPSK. The modulating meta-surface 261 is a transmissive meta-surface configured to independently modulate the local oscillator signal to obtain a spatially surface modulated signal at the modulating meta-surface 261. In at least some embodiments, the modulating meta-surface 261 yields a surface-modulated wireless signal, e.g., radiating substantially in a z-direction. A reflection-mode transmitter can be lossless for BPSK but introduces loss for OOK. An OOK transmission-mode transmitter can be lossless but reflects power to oscillators or, if necessary, absorbs the carrier without reflection.

It is understood that any of the example modulating meta-surfaces may be modulated with digital signals, which may include multi-level digital signals, i.e., not just binary digital signals. It is further understood that the modulating meta-surfaces modulated with digital signals may be routed external to any guiding parallel plate waveguides.

Figures 2G, 2H:
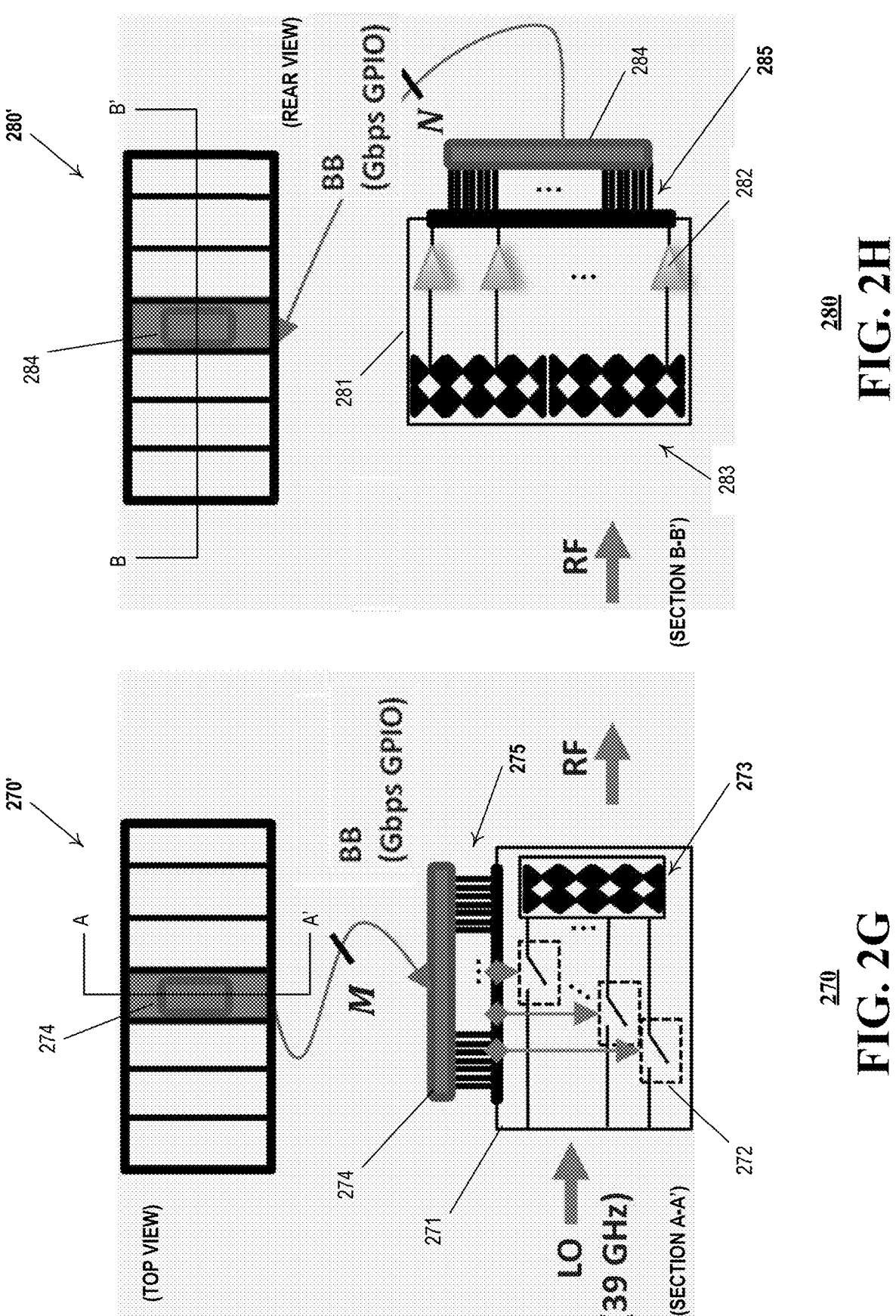
FIG. 2G is a block diagram illustrating an example, non-limiting embodiment of a modulating meta-surface transmitter functioning within the communication network of FIG. 1 in accordance with various aspects described herein.
FIG. 2H is a block diagram illustrating an example, non-limiting embodiment of a modulating meta-surface receiver functioning within the communication network of FIG. 1 in accordance with various aspects described herein.

FIG. 2G is a block diagram illustrating an example, non-limiting embodiment of a modulating meta-surface transmitter 270 functioning within the communication network 100 of FIG. 1 in accordance with various aspects described herein. According to a top view of the example modulating meta-surface transmitter 270', a baseband circuit, e.g., a baseband input/output (I/O) circuit 274 is positioned along a top surface of a housing 271 of the modulating meta-surface transmitter 270. A cross-section of the modulating meta-surface transmitter 270 taken along A-A' is also illustrated. According to the cross-sectional view, the modulating meta-surface transmitter 270 includes a group of controllable meta-surface transmit cells 272. The group of controllable meta-surface transmit cells 272 are positioned between a local oscillator and a group of radiating elements 273. The group of controllable meta-surface cells 272 are also in communication with the baseband I/O circuit 274 via a group of I/O control leads 275. The I/O control leads 275 connect the baseband I/O circuit 274 to the group of controllable meta-surface transmit cells 272, allowing the baseband I/O circuit 274 to selectively control individual cells of the group of controllable meta-surface transmit cells 272 in an independent and/or collective manner.

In at least some embodiments, the group of controllable meta-surface transmit cells 272 directly modulate the local oscillator, e.g., altering one or more of an amplitude and/or a phase of the local oscillator to produce a modulated RF signal centered at a frequency of the local oscillator, e.g., 39 GHz. It is envisioned that modulation rates may extend well into the GHz range, providing a relatively simple, cost-effective transmitter, without necessarily requiring frequency conversion, and/or analog-to-digital conversion and/or digital-to-analog conversion. In at least some embodiments, the group of controllable meta-surface cells 272 can be configured as passive devices, e.g., without requiring active control, e.g., transistor control, gain, and so on.

FIG. 2H is a block diagram illustrating an example, non-limiting embodiment of a meta-surface receiver 280 functioning within the communication network of FIG. 1 in accordance with various aspects described herein. It is envisioned that in at least some embodiments, a meta-surface communication device may include a meta-surface receiver 280. According to a rear view of the example meta-surface receiver 280', a baseband circuit, e.g., a baseband input/output (I/O) circuit 274 is positioned along a rear surface of a housing 281 of the meta-surface receiver 280. A cross-section of the meta-surface receiver 280 taken along B-B' is also illustrated. According to the cross-sectional view, the meta-surface receiver 280 includes a group of meta-surface receiver cells 282. The group of controllable meta-surface receiver cells 282 are positioned between a group of wireless receiver elements 283. The group of meta-surface receiver cells 282 are also in communication with the baseband I/O circuit 284 via a group of I/O signal leads 285. The I/O signal leads 285 connect the baseband I/O circuit 284 to the group of meta-surface receiver cells 282, allowing the baseband I/O circuit 284 to receive input from individual cells of the group of meta-surface receiver cells 282 in an independent and/or collective manner.

In at least some embodiments, the group of meta-surface receiver cells 282 directly modulate the local oscillator, e.g., detecting information according to one or more of an amplitude and/or a phase of a received RF signal to produce a de-modulated information signal at baseband. In at least some embodiments, a meta-surface communication device may be configured to transmit and receive information, e.g., according to the illustrative examples provided herein and/or techniques generally known to those skilled in wireless communications.

It is understood that at least some unit cells of a modulating meta-surface may be modulated to impress information upon an RF carrier signal emanated from the modulating meta-surface. Any suitable modulation techniques may be applied, however, according to the simple structures disclosed herein, it may be appreciated that simple forms of modulation may be used. For example, OOK modulation of a unit cell of a modulating meta-surface may be supported by setting a resonant frequency of the unit cell to coincide with an operating frequency $f_0$ (blue curves) for one state and below the resonant frequency $f_0 - \Delta f$ for the other state. BPSK modulation is supported by setting the UC resonant frequency to be either above the resonant frequency $f_0 + \Delta f$ (red curves) or below the resonant frequency $f_0 - \Delta f$. According to the example OOK modulation, a "1" corresponds to a near full-scale ($|S_{21}| \approx 1$), whereas a "0" corresponds to a near minimum ($|S_{21}| \approx 0$), respectively. In either state of OOK modulation, the value of $\angle S_{21}$ may be arbitrary. Other simple modulations include BPSK modulation, e.g., in which a "1" corresponds to $\angle S_{21} = \theta_0$, whereas a "0" corresponds to $\angle S_{-21} = \theta_0 + 180°$. In either state of BPSK modulation, the value of $|S_{21}| \approx 1$ for either or both states, e.g., to ensure high-power operation. Still other simple modulation formats include dual OOK/BPSK modulation, which may be supported if a unit-cell contains two control elements allowing for at least three distinct states (or resonant frequencies).

Figure 2I:
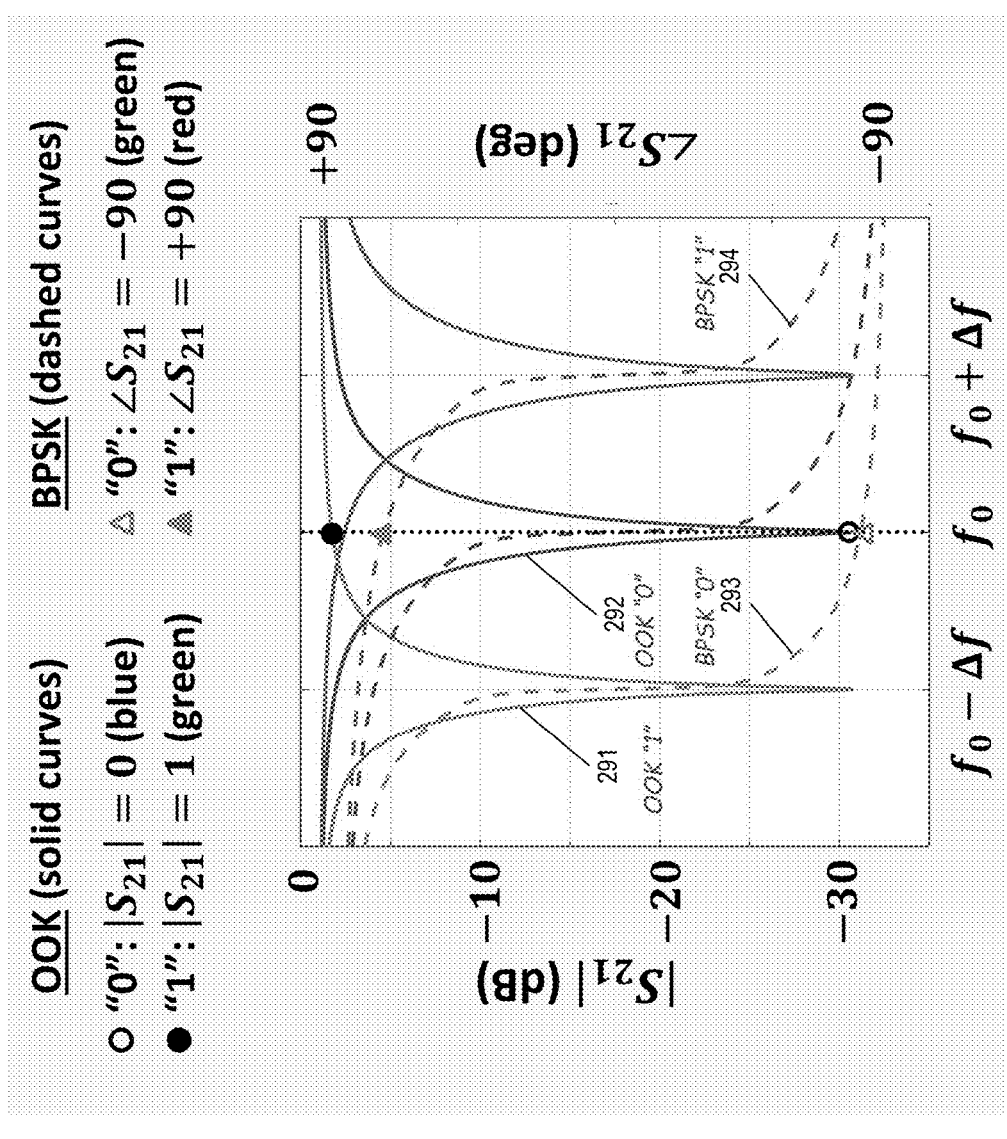
FIG. 2I is a graph illustrating an example, non-limiting embodiment of a modulating meta-surface transmitter functioning within the communication network of FIG. 1 in accordance with various aspects described herein.

FIG. 2I is a graph illustrating an example, non-limiting embodiment of a meta-surface transmitter performance 290 functioning within the communication network 100 of FIG. 1 in accordance with various aspects described herein. According to the illustrative example, a center frequency, $f_0$, corresponds to an LO frequency, e.g., 39 GHz. A first curve 291 represents a magnitude of a transmission coefficient, $|S_{21}|$, under an OOK modulation, with a modulated value of a "1". According to the first curve 291, the magnitude of the transmission coefficient at center frequency, $f_0$, is approximately 0 dB corresponding to a logical "1." A second curve 292 represents a magnitude of the transmission coefficient, $|S_{21}|$, under an OOK modulation, with a modulated value of a "0". According to the second curve 292, the magnitude of the transmission coefficient at center frequency, $f_0$, is approximately −30 dB corresponding to a logical "0."

It is understood that the illustrated performance may be obtained using a resonant circuit configured to include at least one tunable element. The tunable element may be operable according to a modulation input signal, such that the tunable element may be tuned by the modulation input signal. The resonant circuit, responsive to tuning, may exhibit a predetermined and/or otherwise repeatable shift in resonance under different modulation input signal conditions, e.g., shifting a resonant absorptive line on or away from a particular frequency, such as the example center frequency, $f_0$.

According to the illustrative example, a third curve 293 represents a phase of a transmission coefficient, $\angle S_{21}$, under a BPSK modulation, with a modulated value of a "0". According to the third curve 293, the phase of the transmission coefficient at center frequency, $f_0$, is approximately −90 deg. corresponding to a logical "0." A fourth curve 294 represents a phase of the transmission coefficient, $\angle S_{21}$, under a BPSK modulation, with a modulated value of a "1". According to the fourth curve 294, the phase of the transmission coefficient at center frequency, $f_0$, is approximately +90 deg. corresponding to a logical "1."

FIG. 2J is planar view illustrating a front view of an example, non-limiting embodiment of a modulating meta-surface unit cell 296a (FIG. 2K) functioning within the communication network 100 of FIG. 1, in accordance with various aspects described herein. The example modulating meta-surface unit cell 296a includes a front circuit portion 295a residing on a front surface of the modulating meta-surface unit cell 296a. The example front circuit portion 295a includes a first impedance matching circuit configured to promote an electrical coupling of the modulating meta-surface unit cell 296a to a first medium adjacent to a front side of the modulating meta-surface unit cell 296a and presenting a first impedance, e.g., a first characteristic impedance, which may differ from an impedance of the modulating meta-surface unit cell 296a.

According to the illustrative example, the front circuit portion 295a includes a first electrically conductive layer 295b residing in a first x-y plane and defining a horizontal gap 295c. The horizontal gap 295c divides the first electrically conductive layer 295b into two portions separated by a gap distance, $g_1$, measured between opposing edges of two portions of the first electrically conductive plane 295b. The horizontal gap 295c extends along an x-axis direction and over an entire width, W, of the device. The example first electrically conductive plane 295b configured with the horizontal gap 295c presents a first capacitive reactance to a transverse electrical field, which is illustrated as being oriented perpendicular to the horizontal gap 295c, i.e., in the y-axis direction. The example first electrically conductive plane 295b provides a first shunt capacitance value Cshunt.

FIG. 2K is a side view illustrating a side edge of an example, non-limiting embodiment of a modulating meta-surface unit cell 296a functioning within the communication network 100 of FIG. 1 in accordance with various aspects described herein. The example modulating meta-surface unit cell 296a includes the front circuit portion 295a residing on a front surface of the modulating meta-surface unit cell 296a. The example modulating meta-surface unit cell 296a also includes a supporting layer, e.g., a substrate 296b. According to the illustrative example, the substrate 296b includes a substantially planer, insulating layer that may be formed from an insulating, e.g., a dielectric material. Likewise, the rear circuit portion 297a may be supported on an opposing, rear surface of the insulating, e.g., dielectric, substrate 296b. The example modulating meta-surface unit cell 296a also includes a rear circuit portion 297a residing on a rear surface of the modulating meta-surface unit cell 296a. The rear circuit portion 297a resides within a second x-y plane displaced along a z-axis by a distance $t_{subs}$, corresponding to a thickness of the substrate 296b.

FIG. 2L is a planar view illustrating a rear circuit portion 297a of an example, non-limiting embodiment of a modulating meta-surface unit cell 296a functioning within the communication network 100 of FIG. 1 in accordance with various aspects described herein. In at least some embodiments, the rear-circuit portion 297a includes a device layer. The device layer may include a controllable device configured to respond to a modulation control signal. A response may include variation of an electrical parameter, such as a voltage, a current, an impedance and/or a reactance. Alternatively, or in addition, the response may include variation of a mechanical parameter, such as a displacement, a rotation and/or a deformation. In at least some embodiments, the response may include variation of an optical and/or an electro-optical parameter, such as a reflectivity, a transmissivity, and/or a polarization. Devices suitable for producing such responses may include, without limitation, semiconductor devices, e.g., transistors, FETs, diodes, PIN diodes, varactors, piezoelectric devices, micro electro-mechanical systems (MEMS), nano electro-mechanical systems (NEMS), and so on.

The device layer may include a control device 295d, such as a semiconductor control device, e.g., an amplifier, a transistor and/or a diode. According to the illustrative example, the semiconductor control device 295d includes a diode, and in particular, a varactor diode. The example rear circuit portion 297a includes a control device circuit configured to bias and/or promote an electrical coupling of the modulating meta-surface unit cell 296a to a second medium adjacent to a rear side of the modulating meta-surface unit cell 296a. The second medium may present a second impedance, e.g., a second characteristic impedance, which may differ from an impedance of the modulating meta-surface unit cell 296a.

According to the illustrative example, the rear circuit portion 297a includes a second electrically conductive layer 297b residing in a second x-y plane and coupled to the control device 297d. In at least some embodiments, the control device 297d may be electrically coupled between the second electrically conductive layer 297b and the front circuit portion 295a. A width, S, of the second electrically conductive layer 297b is less than the entire width, W, of the device 296a (FIG. 2K), i.e., S<W. A p-n junction of the control device 295d, i.e., the varactor diode, presents a second capacitive reactance, $C_j$. According to the illustrative example, the shunt capacitance of the front circuit portion 295a is much less than the junction capacitance of the varactor diode, i.e., Cshunt<<Cj.

Further according to the illustrative example, the configuration of the second electrically conductive layer 297b being narrower than the entire width of the modulating meta-surface unit cell 296 results in an inductive reactance, e.g., according to a series inductance. It is understood that the resulting structure of the modulating meta-surface unit cell 296a provides an electric circuit having a frequency response that may represent at least one resonance. A location of the resonance may be controlled by a configuration of one or more of the front circuit portion 295a, the rear circuit portion 297a and/or parameters and/or dimensions of the substrate 296b, e.g., an electric permittivity and/or magnetic permeability of the substrate 296b, a conductivity of the substrate 296b and/or a size, e.g., thickness of the substrate 296b.

Figure 2M:
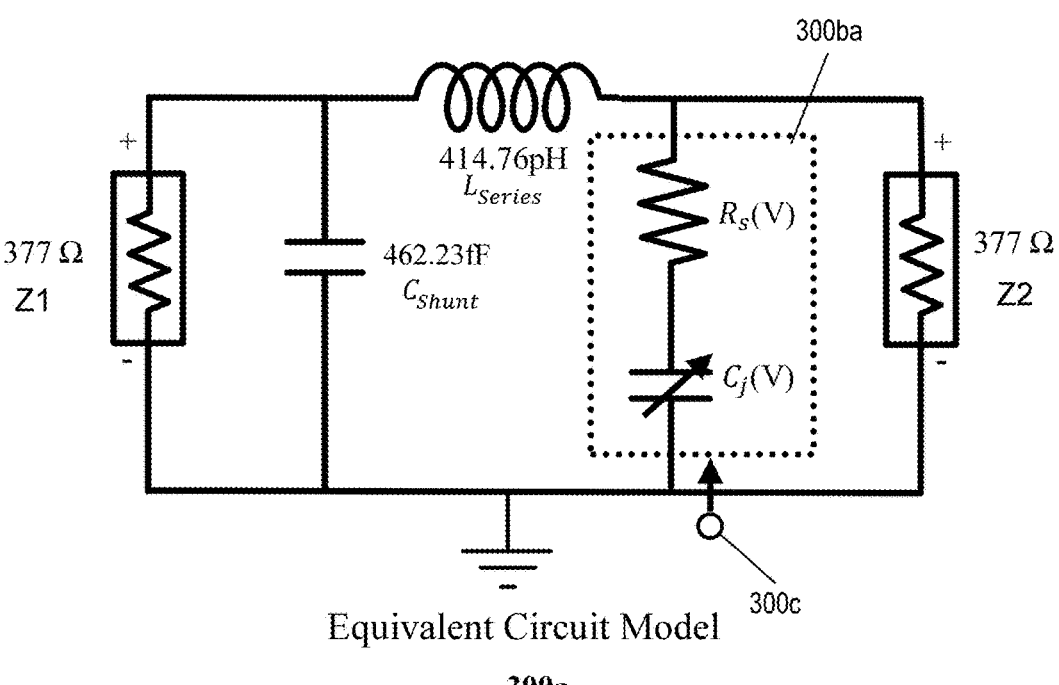
FIG. 2M is a schematic diagram illustrating an example, non-limiting embodiment of an equivalent circuit model of a modulating meta-surface unit cell in accordance with various aspects described herein.

FIG. 2M is a schematic diagram illustrating an example, non-limiting embodiment of an equivalent circuit model 300a of a modulating meta-surface unit cell in accordance with various aspects described herein. The equivalent circuit model 300a includes a first shunt resistive impedance, $Z_1$, e.g., representing an impedance of an RF distributor, e.g., a parallel-plate waveguide. The equivalent circuit model 300a further includes a first shunt capacitor, $C_{shunt}$, e.g., corresponding to the front circuit portion 295a of the example modulating meta-surface unit cell 296a. The equivalent circuit model 300a further includes an equivalent circuit of the control device, e.g., a varactor diode equivalent circuit 300b. The varactor diode equivalent circuit 300b includes an equivalent resistive value, Rs(V), and an equivalent series capacitive value, Cj(V). The equivalent resistive and series capacitance values are illustrated as being dependent upon, i.e., functions of a voltage value, V. It is understood that a controlling voltage may be provided by a modulation control signal as may be connected to the varactor diode via a control terminal 300c. The varactor diode equivalent circuit 300b, in turn, is connected to the first shunt capacitor via a series inductor, $L_{series}$, representing the inductor of the rear-circuit portion 397a. The varactor diode equivalent circuit 300b is connected to a second shunt resistive impedance, $Z_2$, e.g., representing an impedance of a radiating medium, e.g., free space.

Figure 2N:
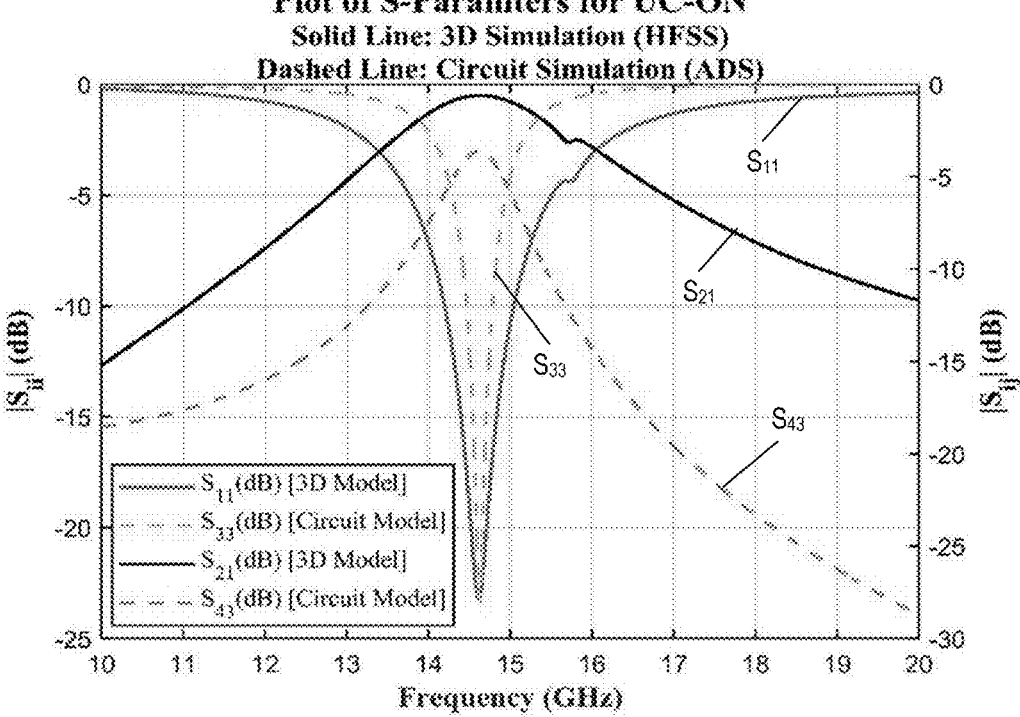
FIG. 2N is a graph illustrating operational performance of the example, non-limiting embodiment of the equivalent circuit model of a modulating meta-surface unit cell illustrated in FIG. 2M in accordance with various aspects described herein.

FIG. 2N is a graph illustrating scattering parameters versus frequency 301 obtained from models of the modulating meta-surface unit cell 296a illustrated in FIG. 2M in accordance with various aspects described herein. In particular, the illustrated scattering parameters $S_{11}$, $S_{33}$, $S_{21}$, $S_{43}$, were obtained for an "ON" condition, i.e., corresponding to a modulation control signal of a logical "1." According to a first model corresponding to a three-dimensional model of the modulating meta-surface unit cell 296a, a first scattering parameter, $S_{11}$, represents a first return loss versus frequency, while a second scattering parameter, $S_{22}$, represents a first insertion loss versus frequency. The first model exhibits a resonance response at a first resonant frequency, e.g., at about 14.6 GHz. According to a second model corresponding to the example equivalent circuit model 300*a*, a third scattering parameter, $S_{33}$, represents a second return loss versus frequency, while a fourth scattering parameter, $S_{44}$, represents a second insertion loss versus frequency. The second model also exhibits a resonance response at about the same first resonant frequency, suggesting that the equivalent circuit model 300*a* is a reasonable approximation of the modulating meta-surface unit cell 296*a*.

The illustrative example of the equivalent circuit model 200*a* (FIG. 2M) represents a unit-cell operating at approximately 15 GHz and designed for interface with an LVDS baseband differential pair having a single-ended voltage swing of 1.025V to 1.325V. Design:

$$f_o = 15 \text{ GHz}, h = w = \frac{\lambda}{2} = 10 \text{ mm},$$

$t_{metal}$=0.5 oz=17.5 µm. The example diode package is about 0.37×0.70 mm, with an ON-model (1.025V) and $R_S$=0.61Ω, $C_j$=0.82 pF. An example substrate: Rogers RO4350 ($\epsilon_r$=3.55). To achieve a suitable match, the substrate thickness was varied, e.g., such that $t_{subs}$=[0.01:0.1:0.762] mm and g=[0.01:0.1:1] mm. According to the example matched condition, g=0.01 mm and $t_{subs}$=0.01 mm. The values of g and $t_{subs}$ may be varied for fabrication, e.g., with both increasing together, which would require relatively small gaps. The resulting S-parameters show an ON-state in which the varactor is biased to 1.025V, with a very high $S_{21}$ transmission (>−1 dB). In an OFF state, the varactor is biased to 1.325V, producing a resonance shift to a higher frequency, with a very low transmission, e.g., the value of $|S_{21}|$ becomes very low.

FIG. 2O is a perspective view illustrating an example, non-limiting embodiment of a shunt capacitive portion 310 of a unit cell of an intelligent communication surface in accordance with various aspects described herein. The shunt capacitive portion 310 includes a conductive element defining a gap 312. The conductive element 311 includes a planar conductor parallel to a transverse electric field, with the gap 312 aligned within a plane of the conductive element 311 and oriented perpendicular to the transverse electric field. FIG. 2P is a schematic diagram illustrating an example, non-limiting embodiment of an equivalent circuit 313 of the shunt capacitive portion 310 of unit cell of an intelligent communication surface illustrated in FIG. 2O in accordance with various aspects described herein, and FIG. 2Q is a graph illustrating a capacitance-versus-frequency curve 314 of the example, non-limiting embodiment of the equivalent circuit 313 of the shunt capacitive portion 310 of the unit cell of the intelligent communication surface illustrated in FIG. 2P in accordance with various aspects described herein. It is envisioned that the shunt capacitive portion 310 may be used within a layered modulating meta-surface unit cell construction, e.g., as a building block for one or more of a matching circuit and/or a control device biasing circuit.

Figure 2S:
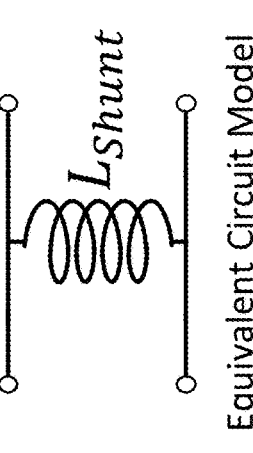
FIG. 2S is a schematic diagram illustrating an example, non-limiting embodiment of an equivalent circuit of the shunt inductive portion of unit cell of an intelligent communication surface illustrated in FIG. 2R in accordance with various aspects described herein.
Figure 2T:
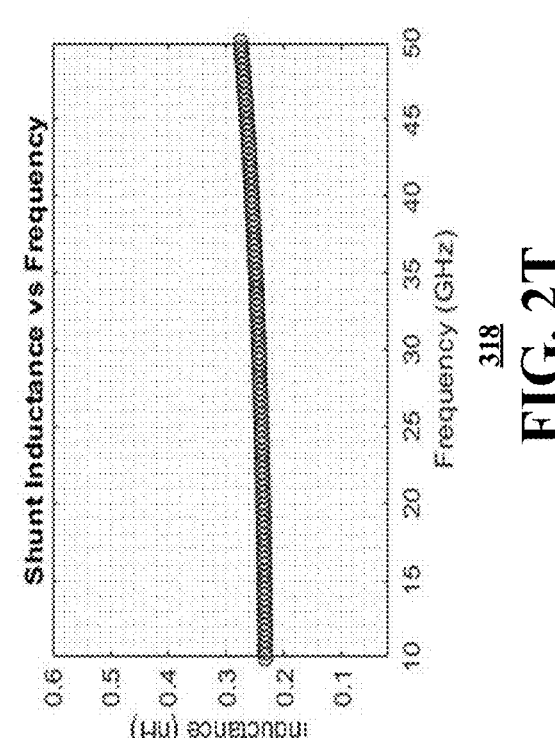
FIG. 2T is a graph illustrating a performance of the example, non-limiting embodiment of the equivalent circuit of the shunt inductive portion of the unit cell of the intelligent communication surface illustrated in FIG. 2S in accordance with various aspects described herein.
Figure 2R:
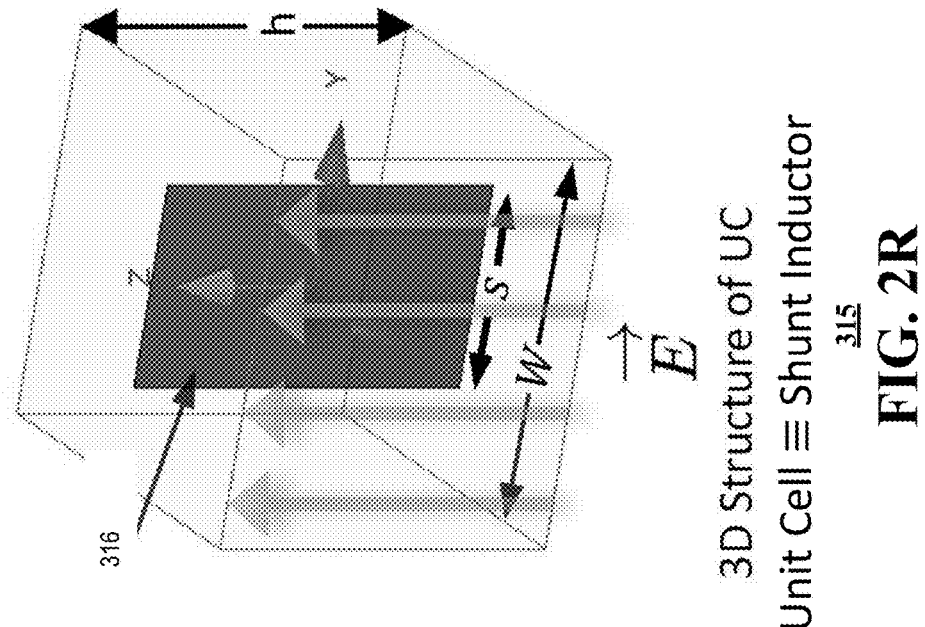
FIG. 2R is a perspective view illustrating an example, non-limiting embodiment of a shunt inductive portion of a unit cell of an intelligent communication surface in accordance with various aspects described herein.

FIG. 2R is a perspective view illustrating an example, non-limiting embodiment of a shunt inductive portion 315 of a unit cell of an intelligent communication surface in accordance with various aspects described herein. The shunt inductive portion 315 includes a conductive element 316 including a planar conductor parallel to a transverse electric field, having a width, S, which is less than a width, W, of the shunt inductive portion 315 of the unit cell and oriented perpendicular to the transverse electric field. FIG. 2S is a schematic diagram illustrating an example, non-limiting embodiment of an equivalent circuit 317 of the shunt inductive portion 315 of unit cell of an intelligent communication surface illustrated in FIG. 2R in accordance with various aspects described herein, and FIG. 2T is a graph illustrating an inductance-versus-frequency curve 318 of the example, non-limiting embodiment of the equivalent circuit 317 of the shunt inductive portion 315 of the unit cell of the intelligent communication surface illustrated in FIG. 2S in accordance with various aspects described herein. It is envisioned that the shunt inductive portion 315 may be used within a layered modulating meta-surface unit cell construction, e.g., as a building block for one or more of a matching circuit and/or a control device biasing circuit.

Figure 2V:
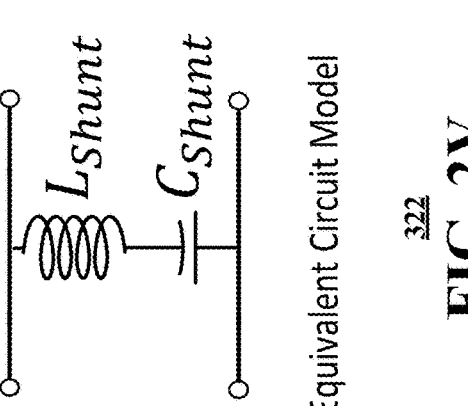
FIG. 2V is a schematic diagram illustrating an example, non-limiting embodiment of an equivalent circuit of the shunt impedance portion of unit cell of an intelligent communication surface illustrated in FIG. 2U in accordance with various aspects described herein.
Figure 2W:
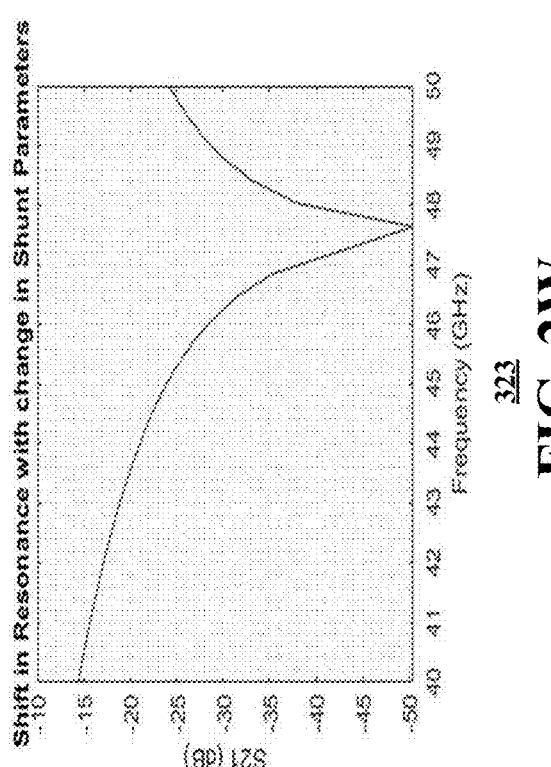
FIG. 2W is a graph illustrating a performance of the example, non-limiting embodiment of the equivalent circuit of the shunt impedance portion of the unit cell of the intelligent communication surface illustrated in FIG. 2V in accordance with various aspects described herein.
Figure 2U:
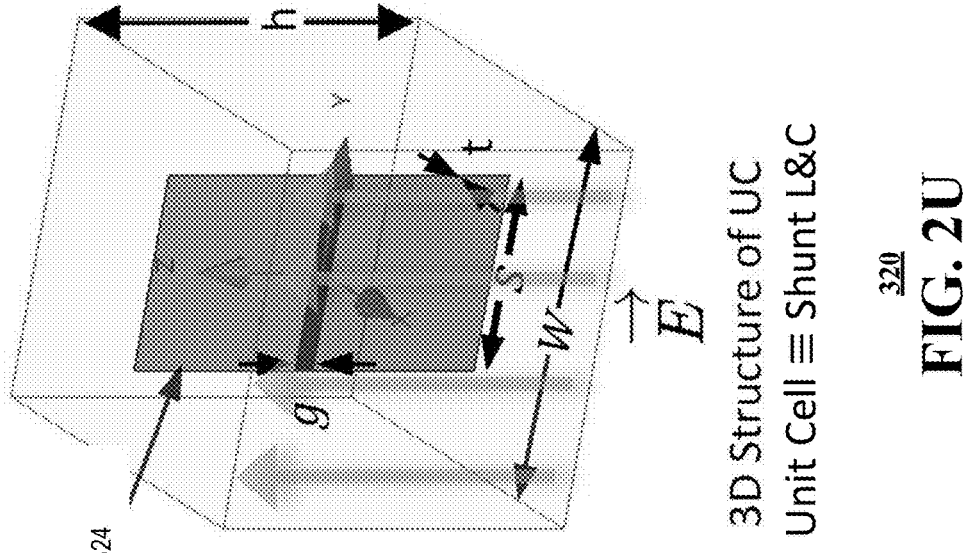
FIG. 2U is a perspective view illustrating an example, non-limiting embodiment of a shunt impedance portion of a unit cell of an intelligent communication surface in accordance with various aspects described herein.

FIG. 2U is a perspective view illustrating an example, non-limiting embodiment of a shunt impedance portion 320 of a unit cell of an intelligent communication surface in accordance with various aspects described herein. The shunt impedance portion 320 includes an electrically conductive element 324 including a planar conductor parallel to a transverse electric field, having a width, S, which is less than a width, W, of the shunt inductive portion 315 of the unit cell and oriented perpendicular to the transverse electric field. The electrically conductive element 324 defines a gap 312 aligned within a plane of the conductive element 311 and oriented perpendicular to the transverse electric field. The gap separates portions of the electrically conductive element 324 by a gap distance, g. FIG. 2V is a schematic diagram illustrating an example, non-limiting embodiment of an equivalent circuit 322 of the shunt impedance portion 320 of unit cell of an intelligent communication surface illustrated in FIG. 2U in accordance with various aspects described herein, and FIG. 2W is a graph illustrating an insertion loss versus frequency curve 323. The insertion loss is represented as a magnitude of a transmission coefficient, $|S_{21}|$, of the example, non-limiting embodiment of the equivalent circuit 322 of the shunt impedance portion 320 of the unit cell of the intelligent communication surface illustrated in FIG. 2V in accordance with various aspects described herein. It is envisioned that the shunt impedance portion 320 may be used within a layered modulating meta-surface unit cell construction, e.g., as a building block for one or more of a matching circuit and/or a control device biasing circuit.

Figure 2X:
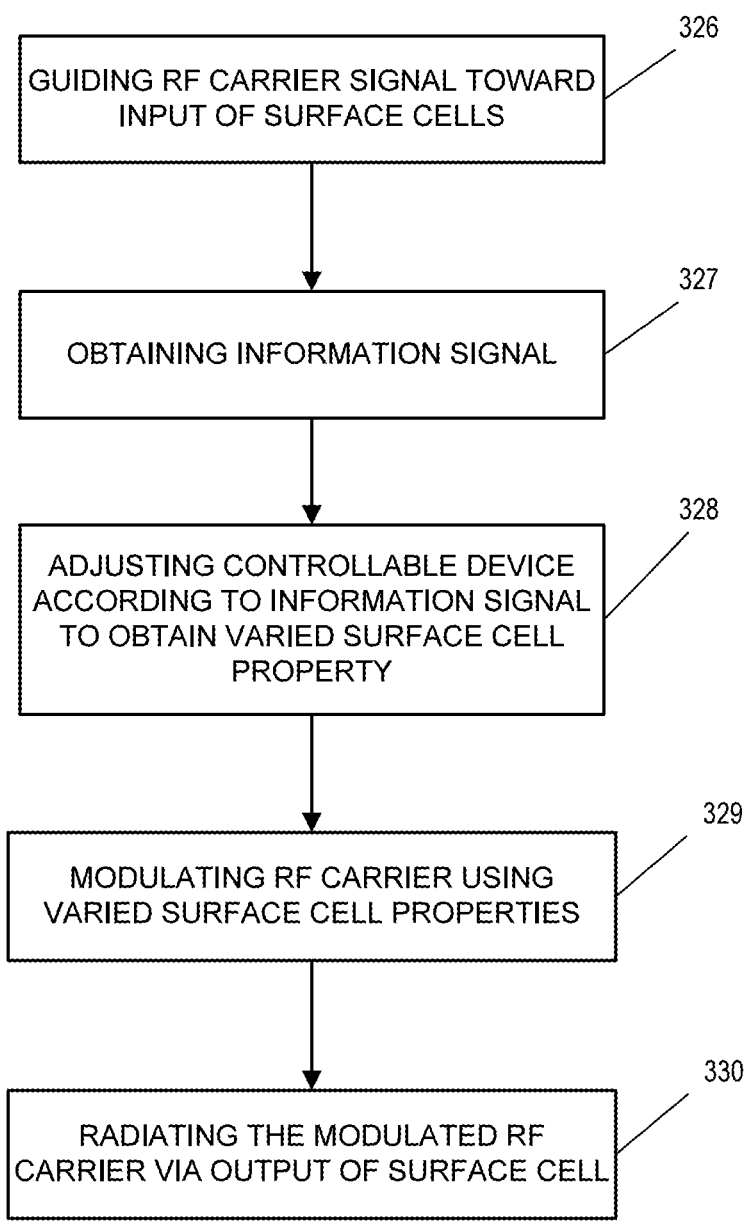
FIG. 2X depicts an illustrative embodiment of an intelligent communication surface process in accordance with various aspects described herein.

FIG. 2X depicts an illustrative embodiment of an intelligent communication surface process 325 in accordance with various aspects described herein. The process 325 includes guiding an RF carrier signal towards an input port of a group of surface cells, at 326. The RF carrier may be provided from a local oscillator operating at carrier frequency. The carrier frequency may reside in the RF band, including but not limited to microwave bands, millimeter bands, and beyond. The surface cells may include controllable devices having at least one input port adapted to receive the RF carrier signal. In at least some embodiments, and without limitation, the input port includes a surface of an electronic circuit, such as the example layered circuit devices disclosed herein. In at least some embodiments, the guiding of the RF carrier signal may be performed by a waveguiding structure. The waveguiding structure may include electrically conducting waveguides, e.g., hollow rectangular waveguides, parallel plate waveguides, and the like. Alternatively, or in addition, the waveguide may include dielectric components, e.g., dielectric waveguides. In at least some embodiments, the waveguide structure may include a transmission line, such as a coaxial cable, or a substrate supported transmission line, such as microstrip, stripline, differential lines, semiconductor structures, and the like.

According to the example process 325, information is obtained at 327. For example, an information signal may be obtained from a signal source. The signal source may be proximate to the surface cells or at a geographically remote location. Alternatively, or in addition, the information signal may be generated from an information source, which may be local and/or remote from the surface cells. The information may include digital data corresponding to wireless networks, including any of the example wireless networks disclosed herein. In such contexts, the digital data may include user data, network control data, e.g., implementing a communications control and/or network operator data as may be necessary in operating and/or maintaining a communication network. In at least some embodiments, the information signal may include an electrical signal, such as an LVDS signal.

In at least some embodiments, the surface cells are controllable. Without limitation, control of a surface cell may include varying a physical property of the surface cell. Physical properties may include, without limitation electrical properties, e.g., a resistance, an impedance, a gain and/or attenuation, a resonance property, and the like. Other physical properties may include mechanical properties, such as displacements, deformations, mechanical switching, and so on. According to the example process 325, the controllable devices, e.g., the controllable surface cells, may be adjusted, at 328, according to information signal to obtain varied surface cell properties.

In at least some embodiments, the surface cell includes at least one control terminal configured to receive the information signal. The information signal received by the control terminal may be conveyed to an operative structure, e.g., an electrical circuit and/or a device, such as a switch and/or a diode, including a varactor, adapted to vary a physical property of the surface cell according to the information signal.

Further according to the example process 325, the RF carrier signal may be modulated, at 329 according to the varied surface cell properties. In at least some embodiments, and without limitation, modulation includes direct modulation, such as OOK and/or BPSK modulation. It is understood that an amplitude of the received RF carrier signal, a phase of the received RF carrier signal, or a combination of the amplitude and phase may be altered, adjusted and/or varied according to the information signal based on variations of the physical properties of the surface cells. For example, a resonance of the surface cells, e.g., at or about a frequency of the RF carrier signal, may be varied, such that an amplitude and/or phase of the RF carrier signal changes. If resonance occurs at the RF carrier signal frequency, then the surface cell may produce a substantially large electrical response when stimulated by the RF carrier signal, which may be indicative of a digital value, e.g., a "1." To the extent that a resonance is altered, e.g., moved to some other frequency, then the surface cell may produce a substantially lower-level response when stimulated by the RF carrier signal, which may be indicative of an alternative digital value, e.g., a "0." The resulting response of the surface cell to stimulation by the RF carrier signal produces an output signal that varies according to the information signal, i.e., a modulated RF carrier signal.

In at least some embodiments, modulated RF carrier signal may be emitted and/or otherwise radiated, at 330. Emission and/or radiation may include radiation from a radiating structure, such as an antenna. Antennas may include any suitable structure generally known and adapted to operation at or about the RF carrier signal frequency. For high frequency operation, e.g., microwave and/or millimeter wave, the antenna may include waveguide structures, such as horns, open-ended waveguides, and in at least some embodiments, aperture structures, such as output surfaces of the controllable surface cells. The examples herein disclose surface cells that span an area of a waveguide structure, e.g., having an input surface and an output surface. For transmissive cells, the input and output surfaces are different, e.g., opposing surfaces of the surface cell structure. For reflective cells, the input and output surfaces may overlap, and in at least some instances be identified as substantially the same surface.

While for purposes of simplicity of explanation, the respective processes are shown and described as a series of blocks in FIG. 2X, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2Y:
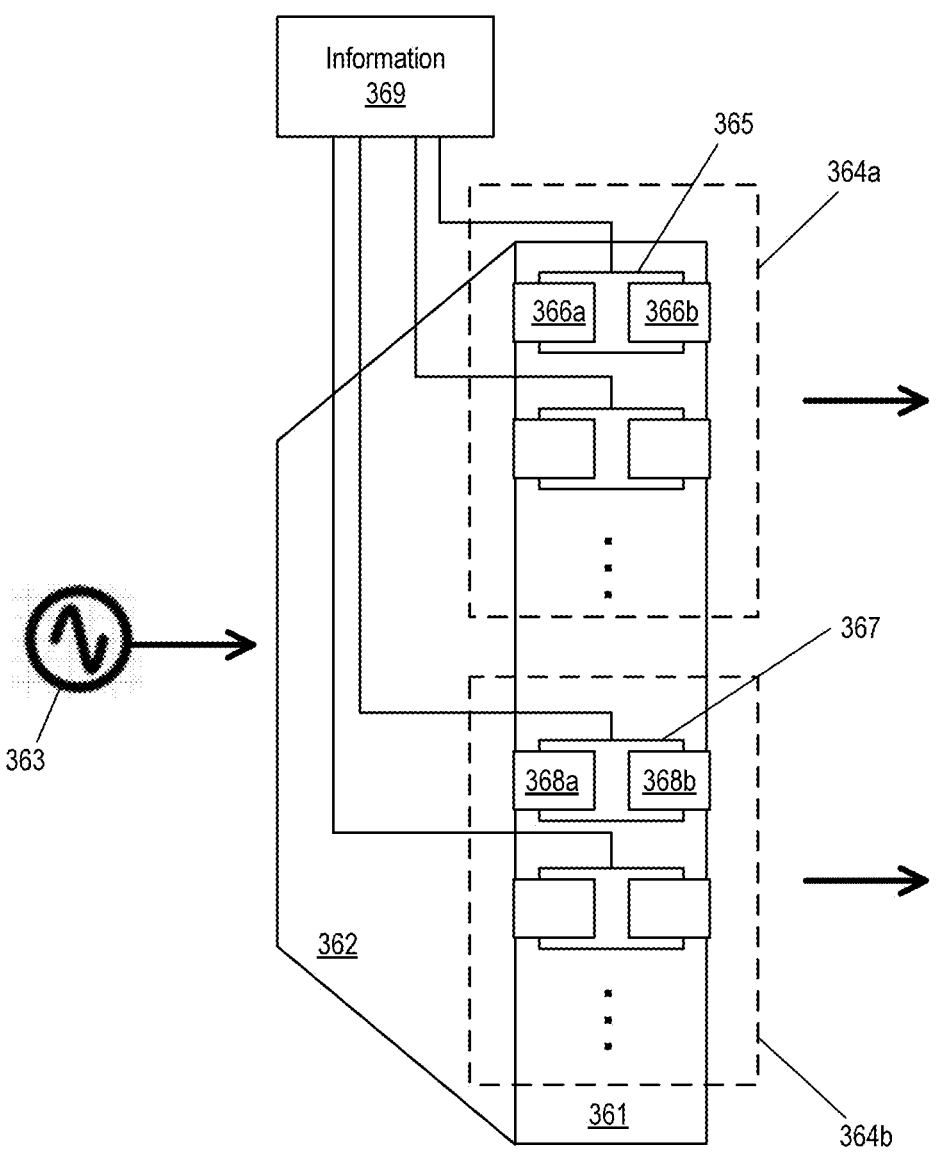
FIG. 2Y is a block diagram illustrating an example, non-limiting embodiment of a modulating meta-surface device functioning within the communication network of FIG. 1 in accordance with various aspects described herein.

FIG. 2Y is a block diagram illustrating an example, non-limiting embodiment of a modulating meta-surface device 360 functioning within the communication network 100 of FIG. 1 in accordance with various aspects described herein. The modulating meta-surface device 360 includes a controllable surface 361 aligned with a signal-guiding structure, such as an antenna, a scatterer, a reflector, and/or a waveguide 263. The waveguide 363 is configured to guide a carrier signal from an RF carrier source 363 to the controllable surface 361. In more detail, the controllable surface 361 includes a first group of controllable surface cells 364a. At least some controllable surface cells 365 of the first group of controllable surface cells 364a include an input surface element 366a and an output surface element 366b. The controllable surface cells 365 of the first group of controllable surface cells 364a are communicatively coupled to an information source 369. At least some controllable surface cells 365 of the first group of controllable surface cells 364a are configured to control a scattering performance of the controllable surface cells 365. For example, at least some of the controllable surface cells 365 of the first group of controllable surface cells 364a may be configured to adjust a transmissive property of the controllable surface cells 365 responsive to an input signal obtained from the information source 369. In operation, at least some of the controllable surface cells 365 of the first group of controllable surface cells 364a are configured to directly modulate the RF carrier signal received at the input surface 366a via a controlling of the scattering parameters, e.g., via an adjustment of the transmissive property of the controllable surface cells 365 to obtain an output signal at the output surface 366b.

In at least some embodiments, the controllable surface 361 includes a second group of controllable surface cells 364b. At least some controllable surface cells 367 of the second group of controllable surface cells 364b include an input surface element 368a and an output surface element 368b. The controllable surface cells 367 of the second group of controllable surface cells 364b are also communicatively coupled to the information source 369. At least some controllable surface cells 367 of the second group of controllable surface cells 367 are configured to control a scattering performance of the controllable surface cells 367. For example, at least some of the controllable surface cells 367 of the second group of controllable surface cells 364b may be configured to adjust a reflective property of the controllable surface cells 367 responsive to an input signal obtained from the information source 369. In operation, at least some of the controllable surface cells 367 of the second group of controllable surface cells 364*b* are configured to directly modulate the RF carrier signal via a controlling of the scattering parameters, e.g., via an adjustment of the reflective property of the controllable surface cells 367. Accordingly, the RF carrier signal received at the input surface 368*a* may be directly modulated by variation of both transmissive properties and reflective properties to obtain an output signal at the output surface 368*b*.

In at least some embodiments, the first group of controllable surface cells 364*a* is located at a first region or area of the controllable surface 361, while the second group of controllable surface cells 364*b* is located at a second region or area of the controllable surface 361. It is envisioned that the first and second regions or areas may be separate and distinct, e.g., isolated from each other. Alternatively, or in addition, the first and second regions or areas may overlap at least partially. In at least some embodiments, the first and second regions or areas may overlap such that the first group of controllable surface cells 364*a* may be integrated with, e.g., interspersed with, the second group of controllable surface cells 364*b*, e.g., according to an integration pattern, e.g., an alternating pattern.

In at least some embodiments, at least a portion of the first group of controllable surface cells 364*a* and at least a portion of the second group of controllable surface cells 364*b* receive substantially the same information from the information source 369. Accordingly, the RF carrier signal may be directly modulated according to the same information by variation of both transmissive properties and reflective properties. Alternatively, or in addition, at least a portion of the first group of controllable surface cells 364*a* may receive a first portion of information from the information source 369, while at least a portion of the second group of controllable surface cells 346*b* may receive a second portion of information from the information source 369, wherein the first and second portions of information differ. Accordingly, the RF carrier signal may be directly modulated by variation of a transmissive property to convey the first portion of information, while the RF carrier signal may also be directly modulated by variation of a reflective property to convey the second portion of information. Although the foregoing example describes transmission of a modulated RF carrier signal, it is understood that in at least some embodiments, the modulating meta-surface device 360 may be adapted to receive an RF signal and perform a demodulation according to a receive function.

It is envisioned that in at least some embodiments, at least some of the controllable surface cells 365, 367 may be configured to directly modulate the RF carrier signal via a controlling of multiple scattering parameters, e.g., via an adjustment of both the reflective property and the transmissive property. Accordingly, the RF carrier signal received at a input surface 366*a*, 368*a* may be directly modulated by variation of both transmissive properties and reflective properties to obtain an output signal at the respective output surface 366*b*, 368*b*. In some embodiments, the same information may be modulated by both transmissive and reflective properties of the same controllable surface cell 365, 367. Alternatively, or in addition, different information may be modulated by both transmissive and reflective properties of the same controllable surface cells 365, 367.

Figure 3:
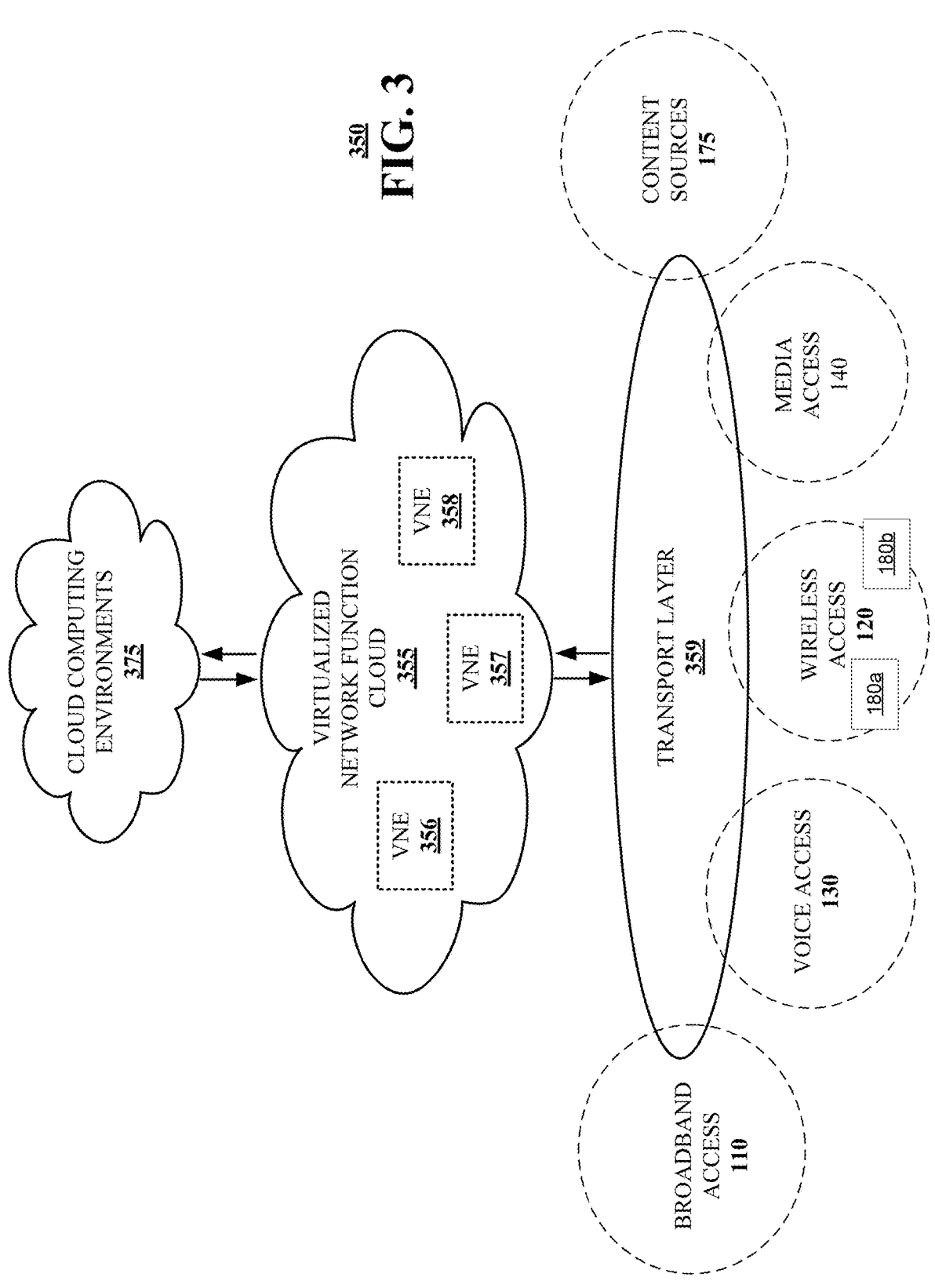
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 350 in accordance with various aspects described herein. In particular a virtualized communication network is presented that can be used to implement some or all of the subsystems and functions of system 100, the subsystems and functions of system 200, and processes 200, 210, 220, 235, 250, 260, 270, 280, 295*a*, 296*a*, 297*a*, 300*a*, 310, 315, 320, and 325 presented in FIGS. 1, 2A, 2B, 2C, 2D, 2E, 2F, 2G, 2H, 2J, 2K, 2L, 2M, 2O, 2R, 2U, 2X and 3. For example, virtualized communication network 300 can facilitate in whole or in part exposing a group of controllable surface cells to an RF carrier signal, for selectively tuning properties of the controllable surface cells according to an information signal and for directly modulating the RF carrier signal according to the varied properties of the group of controllable surface cells.

In particular, a cloud networking architecture is shown that leverages cloud technologies and supports rapid innovation and scalability via a transport layer 350, a virtualized network function cloud 355 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 356, 357, 358, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 356 composed of NFV software modules, merchant silicon, and associated controllers. The software can be written so that increasing workload consumes incremental resources from a common resource pool, and moreover so that it's elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, a transport layer 359 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 356, 357 or 358. These network elements can be included in transport layer 359.

The virtualized network function cloud 325 interfaces with the transport layer 359 to provide the VNEs 356, 357, 358, etc., to provide specific NFVs. In particular, a virtualized network function cloud 355 leverages cloud operations, applications, and architectures to support networking workloads. The virtualized network elements 356, 357 and 358 can employ network function software that provides either a one-for-one mapping of traditional network element function or alternately some combination of network functions designed for cloud computing. For example, VNEs 356, 357 and 358 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall, which creates an elastic function with higher availability than its former monolithic version. These virtual network elements 356, 357, 358, etc., can be instantiated and managed using an orchestration approach similar to those used in cloud compute services.

The cloud computing environments 375 can interface with the virtualized network function cloud 355 via APIs that expose functional capabilities of the VNEs 356, 357, 358, etc., to provide the flexible and expanded capabilities to the virtualized network function cloud 355. In particular, network workloads may have applications distributed across the virtualized network function cloud 355 and cloud computing environment 375 and in the commercial cloud or might simply orchestrate workloads supported entirely in NFV infrastructure from these third-party locations.

In at least some embodiments, the virtualized communication network 350 may include one or more intelligent communication surfaces 180*a*, 180*b*. The intelligent communication surfaces may be configured to expose a group of controllable surface cells of the intelligent communication surfaces 180*a*, 180*b* to an RF carrier signal, to selectively tuning properties of the controllable surface cells according to an information signal and to directly modulating the RF carrier signal according to the varied properties of the group of controllable surface cells.

Figure 4:
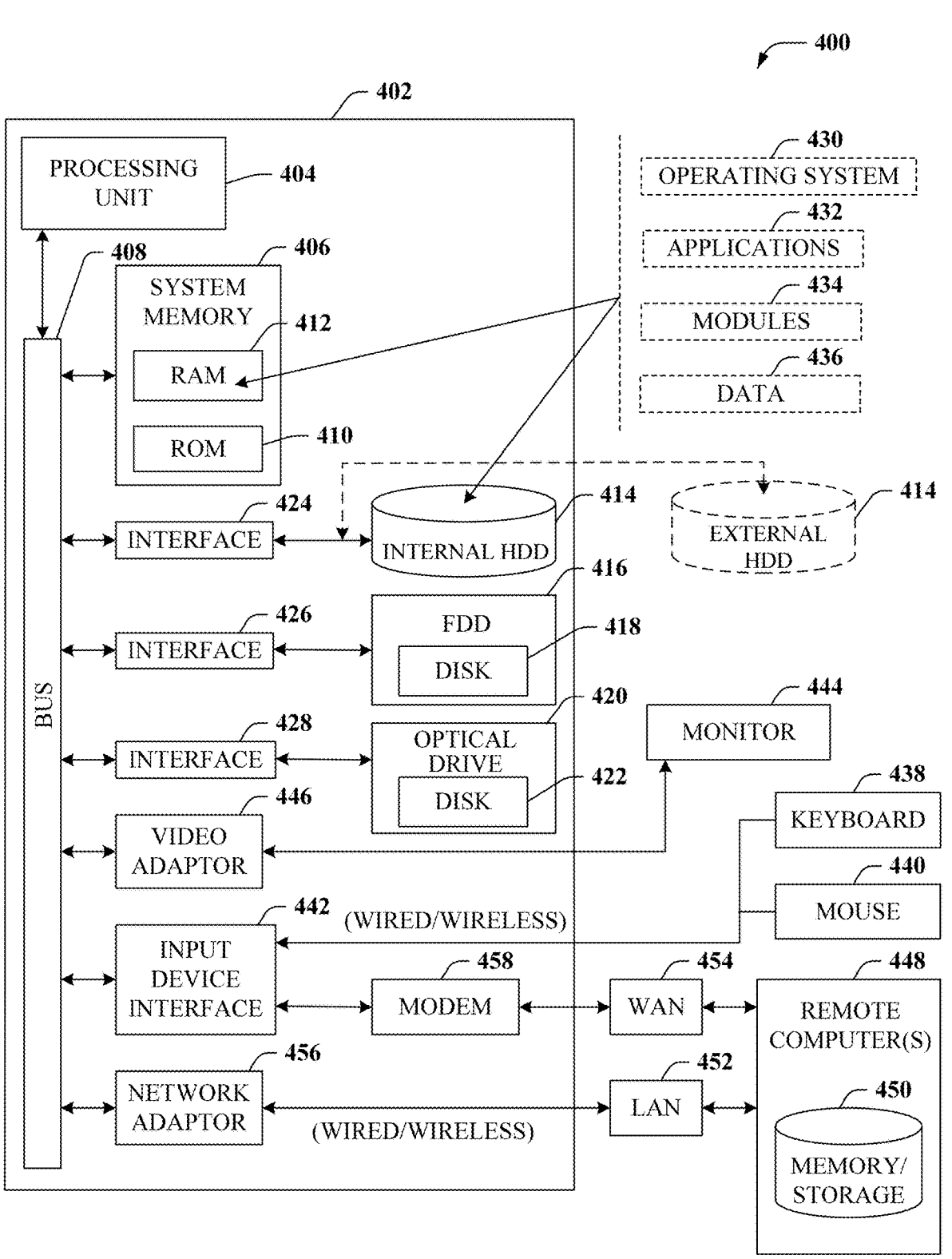
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 356, 357, 358, etc. Each of these devices can be implemented via computer-executable instructions that can run on one or more computers, and/or in combination with other program modules and/or as a combination of hardware and software. For example, computing environment 400 can facilitate in whole or in part exposing a group of controllable surface cells to an RF carrier signal, for selectively tuning properties of the controllable surface cells according to an information signal and for directly modulating the RF carrier signal according to the varied properties of the group of controllable surface cells.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit . . . .

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device

450. It will be appreciated that the network connections shown are examples and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
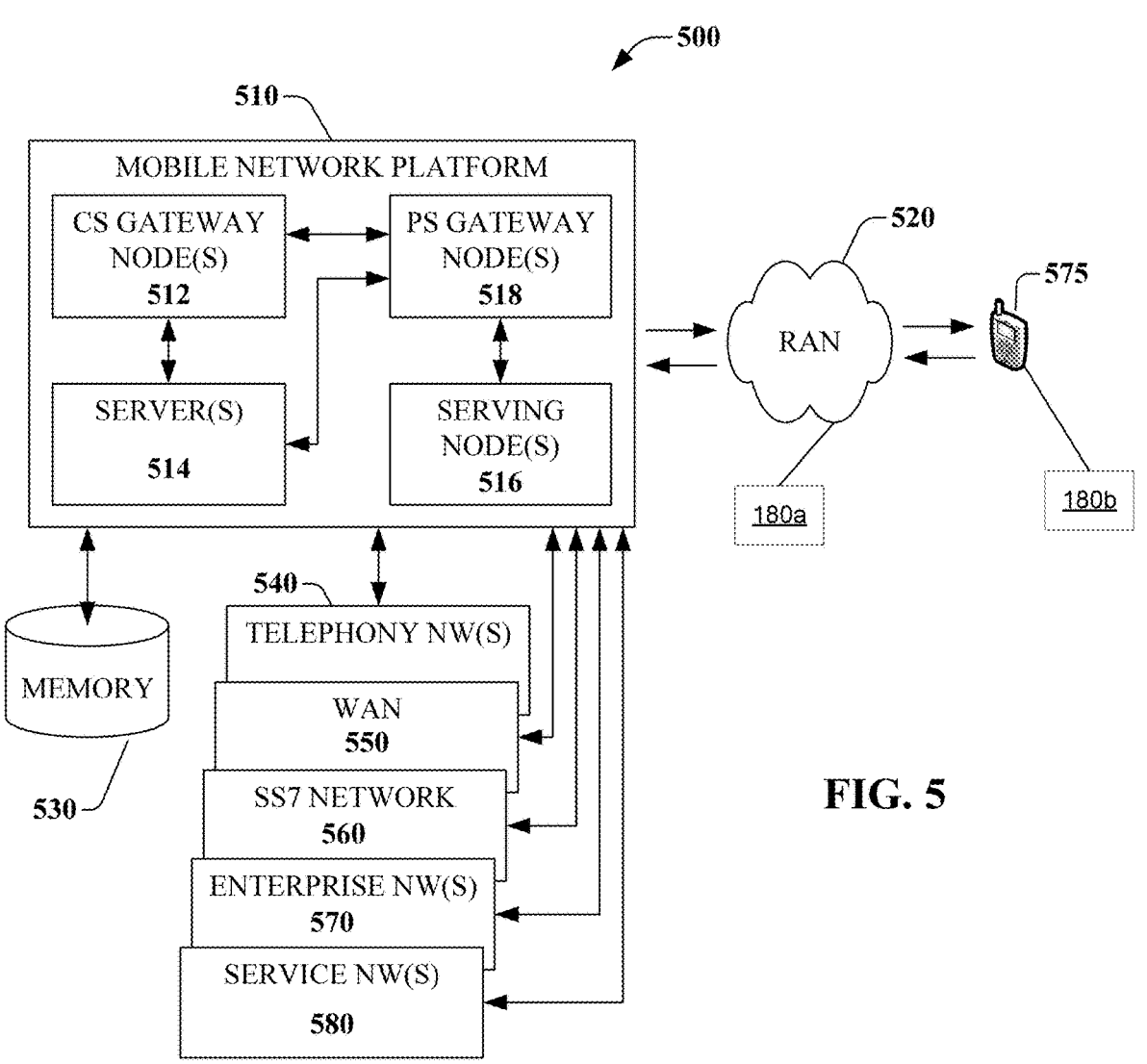
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part exposing a group of controllable surface cells to an RF carrier signal, for selectively tuning properties of the controllable surface cells according to an information signal and for directly modulating the RF carrier signal according to the varied properties of the group of controllable surface cells. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a wireless communication device 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

In at least some embodiments, the embodiment 500 of the mobile network platform 510 may include a RAN 520 and/or a wireless communication device 575 configured with one or more intelligent communication surfaces 180*a*, 180*b*. The intelligent communication surfaces may be configured to expose a group of controllable surface cells of the intelligent communication surfaces 180*a*, 180*b* to an RF carrier signal, to selectively tuning properties of the controllable surface cells according to an information signal and to directly modulating the RF carrier signal according to the varied properties of the group of controllable surface cells.

Figure 6:
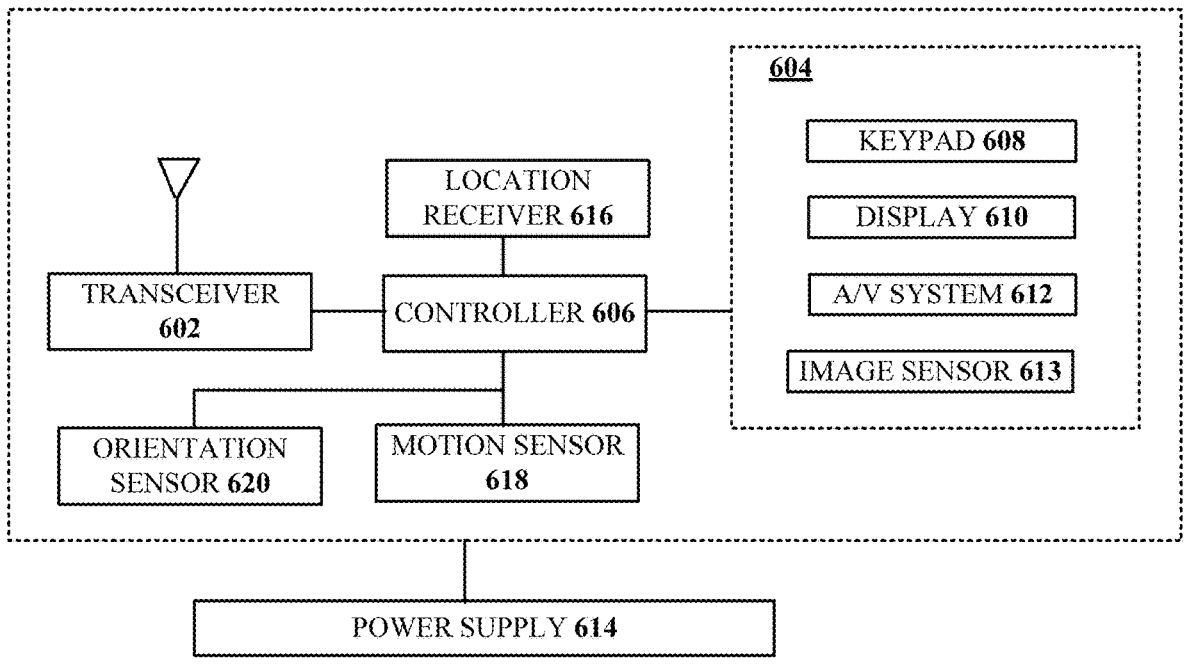
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part exposing a group of controllable surface cells to an RF carrier signal, for selectively tuning properties of the controllable surface cells according to an information signal and for directly modulating the RF carrier signal according to the varied properties of the group of controllable surface cells.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. . . . The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals from an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL- DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $X=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory . . . .

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained . . . .

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
guiding, via a waveguide or a transmission line, a radio frequency (RF) carrier signal towards an input surface of a first controllable surface cell of an intelligent controllable surface to obtain a guided RF carrier signal, wherein the waveguide or the transmission line directly couples a source of the RF carrier signal to the input surface of the first controllable surface cell, and wherein the first controllable surface cell comprises a first controllable device in communication with the input surface and an output surface;
obtaining a first information signal;
adjusting the first controllable device according to the first information signal to obtain a first controlled device, wherein a property of the first controllable surface cell is varied according to the first controlled device to obtain a first varied surface cell property;
modulating the guided RF carrier signal responsive to the first varied surface cell property to obtain a first modulated RF carrier signal; and
radiating the first modulated RF carrier signal via the output surface of the first controllable surface cell.

2. The method of claim 1, wherein the first varied surface cell property comprises a transmissivity property.

3. The method of claim 2, wherein variation of the transmissivity property produces a variation of at least one of an amplitude of the guided RF carrier signal, a phase of the guided RF carrier signal, or a combination thereof to obtain the first modulated RF signal.

4. The method of claim 1, wherein the first varied surface cell property comprises a reflectivity property.

5. The method of claim 4, wherein variation of the reflectivity property produces a variation of at least one of an amplitude or a phase of the guided RF carrier signal to obtain the first modulated RF signal.

6. The method of claim 1, wherein the first information signal comprises low-voltage differential signaling (LVDS).

7. The method of claim 1, wherein the RF carrier signal comprises a millimeter wave signal.

8. The method of claim 1, wherein adjusting the first controllable device further comprises tuning a tunable device.

9. The method of claim 8, wherein the tunable device comprises a passive semiconductor device, and wherein the tuning the tunable device further comprises adjusting one of a current, a voltage, or a combination thereof applied to the passive semiconductor device.

10. The method of claim 8, wherein the tuning the tunable device further comprises adjusting one of a current, a voltage, or a combination thereof applied to a varactor diode configured to tune a reactance of the first controllable surface cell responsive to the first information signal.

11. The method of claim 1, further comprising:
guiding the RF carrier signal towards an input surface of a second controllable surface cell comprising a second controllable device in communication with the input surface and an output surface;
providing a second control terminal in communication with the second controllable device, wherein the second control terminal is configured to receive a second information signal;
adjusting the second controllable device according to the second information signal to obtain a second controlled device, wherein a property of the second controllable surface cell is varied according to the second controlled device to obtain a second varied surface cell property;

modulating the RF carrier signal responsive to the second varied surface cell property to obtain a second modulated RF carrier signal; and radiating the second modulated RF carrier signal via the output surface of the second controllable surface cell, wherein the output surface of the first controllable surface cell is adjacent to the second controllable surface cell.

12. A device, comprising:

a radio frequency (RF) distributor configured to guide an RF carrier signal to obtain a guided RF carrier signal;

a plurality of controllable surface cells of an intelligent controllable surface comprising a plurality of input surfaces in communication with the RF distributor and exposed to the guided RF carrier signal and a plurality of output surfaces;

a plurality of tunable devices associated with the plurality of controllable surface cells, wherein the plurality of tunable devices is adapted to vary properties of the plurality of controllable surface cells;

a modulation controller in communication with the plurality of tunable devices, wherein the modulation controller is configured to modulate the guided RF carrier according to variation of the properties of the plurality of controllable surface cells to obtain a modulated RF carrier signal; and a plurality of emitters in communication with the plurality of output surfaces, wherein the plurality of emitters is configured to radiate the modulated RF carrier signal.

13. The device of claim 12, wherein the plurality of controllable surface cells comprises a plurality of resonant structures.

14. The device of claim 13, wherein the plurality of tunable devices is configured to change resonant properties of the plurality of resonant structures in a predictable manner.

15. The device of claim 12, wherein the plurality of tunable devices comprises a plurality of varactor diodes configured to tune a plurality of reactance values of the plurality of controllable surface cells according to an information signal.

16. The device of claim 12, wherein the modulation controller is configured to modulate the guided RF carrier signal according to a direct modulation of the RF carrier signal.

17. The device of claim 16, wherein the direct modulation comprises one of an on-off-keying (OOK) modulation or a binary phase shift keying (BPSK) modulation.

18. The device of claim 17, the RF carrier signal comprises a millimeter wave carrier signal.

19. An intelligent controllable surface, comprising:

a plurality of controllable surface cells of an intelligent controllable surface comprising a plurality of input surfaces in communication with a waveguide, the input surfaces configured to receive an RF carrier signal via the waveguide, and a plurality of output surfaces;

a plurality of control terminals in communication with the plurality of controllable surface cells, wherein the plurality of control terminals is configured to receive an information signal; and a plurality of controllable devices in communication with the plurality of control terminals, wherein the plurality of controllable devices is configured to control scattering parameters of the plurality of controllable surface cells responsive to the information signal, wherein the scattering parameters impress a direct modulation upon the RF carrier signal to obtain a first modulated RF carrier signal.

20. The intelligent controllable surface of claim 19, wherein the scattering parameters comprise a reflective property and a transmissive property, and wherein the plurality of controllable devices further comprises:

a first group of controllable devices configured to impress a first direct modulation upon the RF carrier according to the reflective property; and a second group of controllable devices configured to impress a second direct modulation upon the RF carrier according to the transmissive property.

* * * * *